United States Patent
Tontiruttananon et al.

(10) Patent No.: US 11,280,913 B2
(45) Date of Patent: Mar. 22, 2022

(54) GLOBAL POSITIONING SYSTEM SPOOFING COUNTERMEASURES

(71) Applicant: AT&T Intellectual Property I, L.P., Atlanta, GA (US)

(72) Inventors: Channarong Tontiruttananon, Redmond, WA (US); Anoop Santh Mayor, Newcastle, WA (US); Ken McDaniel, Snohomish, WA (US); Kuntaporn Saiyos, Snoqualmie, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 356 days.

(21) Appl. No.: 16/428,096

(22) Filed: May 31, 2019

(65) Prior Publication Data
US 2020/0379122 A1    Dec. 3, 2020

(51) Int. Cl.
  *G01S 19/21*    (2010.01)
  *H04K 3/00*    (2006.01)

(52) U.S. Cl.
  CPC .............. *G01S 19/215* (2013.01); *H04K 3/65* (2013.01)

(58) Field of Classification Search
  CPC .................... G01S 19/48; G01S 19/21–215
  See application file for complete search history.

(56) References Cited

U.S. PATENT DOCUMENTS

| | | | |
|---|---|---|---|
| 8,531,332 B2 * | 9/2013 | Gum ..................... | G01S 5/0215 342/357.73 |
| 9,507,026 B2 * | 11/2016 | Nichols ................... | G01S 19/10 |
| 10,162,061 B2 | 12/2018 | Kim et al. | |

(Continued)

FOREIGN PATENT DOCUMENTS

KR    20160094728    8/2016

OTHER PUBLICATIONS

Psiaki et al., "Protecting GPS From Spoofers Is Critical to the Future of Navigation," IEEE Spectrum, Jul. 29, 2016, < https://spectrum.ieee.org/telecom/security/protecting-gps-from-spoofers-is-critical-to-the-future-of-navigation >.

(Continued)

*Primary Examiner* — Cassi J Galt
(74) *Attorney, Agent, or Firm* — Hartman & Citrin LLC

(57) ABSTRACT

Concepts and technologies directed to global positioning system spoofing countermeasures are disclosed. Embodiments can include a system that comprises a processor and a memory that stores computer-executable instructions that configure a processor to perform operations that include identifying a mobile transportation equipment that includes an electronic logging device and a low-power wide area device, where the electronic logging device obtains GPS location data from a GPS receiver unit and the low-power wide area device obtains independent location data via a narrow band path of a low-power wide area network. The operations can include determining that a spatio-temporal misalignment exists between the independent location data and the GPS location data for the mobile transportation equipment, and providing spatio-temporal data alignment. The operations can include determining that a GPS spoofing attack has occurred, and creating a GPS spoofing alert for the mobile transportation equipment.

17 Claims, 9 Drawing Sheets

(56) References Cited

U.S. PATENT DOCUMENTS

| | | | |
|---|---|---|---|
| 11,044,610 B2* | 6/2021 | Korrapati | H04W 12/12 |
| 2017/0227650 A1 | 8/2017 | Grobert | |
| 2020/0371246 A1* | 11/2020 | Marmet | G01S 5/0215 |

OTHER PUBLICATIONS

Tippenhauer et al., "On the Requirement for Successful GPS Spoofing Attacks," Proceedings of the 18$^{th}$ ACM Conference on Computer and Communications Security, Oct. 17-21, 2011, Chicago, Illinois, USA, <https://www.cs.ox.ac.uk/files/6489/gps.pdf>.

Warner et al., "A Simple Demonstration that the Global Positioning System (GPS) is Vulnerable to Spoofing," The Journal of Security Administration, vol. 25, No. 2, pp. 19-27, 2002, <https://permalink.lanl.gov/object/tr?what=info:lanl-repo/lareport/LA-UR-03-2384#page=1&zoom=auto,-205,798>.

Zeng et al., "All Your GPS Are Belong To Us: Towards Stealthy Manipulation of Road Navigation Systems," 27$^{th}$ USENIX Security Symposium, Aug. 15-17, 2018, <https://www.usenix.org/system/files/conference/usenixsecurity18/sec18-zeng.pdf>.

* cited by examiner

GLOBAL POSITIONING SYSTEM SPOOFING COUNTERMEASURES

BACKGROUND

Historically, a limited number of consumer devices were interacting with the global positioning system ("GPS") due to the cost of components. In recent years, the cost of deploying and utilizing GPS has decreased, and therefore an increasing number of devices rely heavily on GPS for navigation, time synchronization, location tracking, and other operations. In commercial implementations, GPS utilizes multiple satellites that broadcast GPS navigation messages that include information such as precise coordinates of the GPS satellite and time. A target GPS receiver can receive the various GPS signals from the GPS satellites, and in turn the target GPS receiver can determine its current location, altitude, velocity, and/or direction. In typical instances, the GPS signals provided by GPS satellites are considered to be relatively weak. In an attempt to ensure continuous operation, target GPS receivers may be configured by the manufacturer to lock-on to, or otherwise utilize, the strongest GPS signals that are available to the target GPS receiver.

A nefarious actor may exploit the relatively weak signals from the GPS satellites by performing a GPS spoofing attack. A GPS spoofing attack refers to the utilization of a GPS spoofing device that operates within the vicinity of the target GPS receiver to generate GPS spoofing signals that overpower the genuine GPS signals so that the target GPS receiver will ignore or otherwise lose track of the genuine GPS signals, and instead lock on to the stronger GPS spoofing signals. The target GPS receiver may interpret the GPS spoofing signals as legitimate, authentic GPS satellite signals, and therefore determine or otherwise update the location, altitude, velocity, and/or direction of the target GPS receiver based on the GPS spoofing signals. Moreover, the target GPS receiver—along with any applications that derive location information from the target GPS receiver—may be unaware that a GPS spoofing attack is occurring and/or has occurred. This can be because a GPS spoofing attack may be done stealthily by transmitting fake, nefarious GPS spoofing signals that are synchronized with the authentic GPS signal, which in turn can gradually overpower the original, authentic GPS signals, thereby causing the target GPS receiver to lock onto the GPS spoofing signals. Nefarious actors may utilize off-the-shelf components and software applications to create GPS spoofing devices in order to stealthily manipulate GPS location information so as to create fake navigation routes that are, or otherwise appear to be, consistent with actual roads and location markers, thereby furthering the opportunity for GPS spoofing attacks to occur.

SUMMARY

The present disclosure is directed to global positioning system spoofing countermeasures, according to various embodiments. According to one aspect of the concepts and technologies disclosed herein, a system is disclosed. In some embodiments, the system can include or otherwise be provided by one or more instances of a network server or other computing system of a network. The system can be communicatively coupled to a network, a radio access network, a low-power wide area network, or the like. In some embodiments, the system can include a processor and a memory. The memory can store computer-executable instructions that, in response to execution by the processor, cause the processor to perform operations. In some embodiments, the operations can include identifying a mobile transportation equipment comprising an electronic logging device and a low-power wide area device, where the electronic logging device obtains GPS location data from a GPS receiver unit and the low-power wide area device obtains independent location data via a narrow band path of a low-power wide area network. The independent location data can include mobile terminal location response data that is joined to local data sensor measurements. The electronic logging device can maintain an hours of service record that tracks movement of the mobile transportation equipment based on the GPS location data.

The operations can further include determining that a spatio-temporal misalignment exists between the independent location data and the GPS location data for the mobile transportation equipment. The operations can further include providing spatio-temporal data alignment that generates electronic logging device estimates and low-power wide area device estimates. The operations can further include determining that a GPS spoofing attack has occurred based on the electronic logging device estimates and the low-power wide area device estimates. The operations can further include creating a GPS spoofing alert for the mobile transportation equipment. In some embodiments, the operations can further include detecting that an off-duty driving mode was activated on the mobile transportation equipment, and obtaining a location obfuscation constraint parameter that defines an allowable deviation distance for the mobile transportation equipment. In some embodiments, in response to determining that a deviation distance exceeds the allowable deviation distance provided by the obfuscation constrain parameter, the operations can include generating corrected route data representing an actual location of the mobile transportation equipment during the spoofing attack. In some embodiments, in response to determining that a deviation distance does not exceed the allowable deviation distance provided by the location obfuscation constraint parameter, the operations can include withholding the GPS spoofing alert from being provided to the electronic logging device until the deviation distance exceeds the allowable deviation distance. In some embodiments, the operations can include generating an hours of service correction command that includes the GPS spoofing alert, where the hours of service correction command instructs the electronic logging device to update an hours of service log with corrected route data and spoofing time identifiers corresponding to the spoofing attack.

According to another aspect of the concepts and technologies disclosed herein, a method is disclosed according to an embodiment. In various embodiments, the method can include identifying, by a network server executing a processor, a mobile transportation equipment comprising an electronic logging device and a low-power wide area device, where the electronic logging device obtains GPS location data from a GPS receiver unit and the low-power wide area device obtains independent location data via a narrow band path of a low-power wide area network. The independent location data can include mobile terminal location response data that is joined to local data sensor measurements. The electronic logging device can maintain an hours of service record that tracks movement of the mobile transportation equipment based on the GPS location data.

The method can further include determining, by the network server, that a spatio-temporal misalignment exists between the independent location data and the GPS location data for the mobile transportation equipment. The method can further include providing, by the network server, spatio-temporal data alignment that generates electronic logging device estimates and low-power wide area device estimates. The method can also include determining, by the network server, that a GPS spoofing attack has occurred based on the electronic logging device estimates and the low-power wide area device estimates. The method can also include creating, by the network server, a GPS spoofing alert for the mobile transportation equipment. In some embodiments, the method can further include detecting, by the network server, that an off-duty driving mode was activated on the mobile transportation equipment, and obtaining a location obfuscation constraint parameter that defines an allowable deviation distance for the mobile transportation equipment. In some embodiments, in response to determining that a deviation distance exceeds the allowable deviation distance provided by the location obfuscation constraint parameter, the method can include generating, by the network server, corrected route data representing an actual location of the mobile transportation equipment during the spoofing attack. In some embodiments, in response to determining that a deviation distance does not exceed the allowable deviation distance provided by the location obfuscation constraint parameter, the method can include withholding, by the network server, the GPS spoofing alert from being provided to the electronic logging device until the deviation distance exceeds the allowable deviation distance. In some embodiments, the method can include generating, by the network server, an hours of service correction command that includes the GPS spoofing alert, where the hours of service correction command instructs the electronic logging device to update an hours of service log with corrected route data and spoofing time identifiers corresponding to the spoofing attack.

According to another aspect of the concepts and technologies disclosed herein, a computer storage medium is disclosed according to an embodiment. The computer storage medium can have computer-executable instructions stored thereon that, in response to execution by a processor of a system, cause the processor to perform operations. In some embodiments, the operations can include identifying a mobile transportation equipment comprising an electronic logging device and a low-power wide area device, where the electronic logging device obtains GPS location data from a GPS receiver unit and the low-power wide area device obtains independent location data via a narrow band path of a low-power wide area network. The independent location data can include mobile terminal location response data that is joined to local data sensor measurements. The electronic logging device can maintain an hours of service record that tracks movement of the mobile transportation equipment based on the GPS location data.

The operations can further include determining that a spatio-temporal misalignment exists between the independent location data and the GPS location data for the mobile transportation equipment. The operations can further include providing spatio-temporal data alignment that generates electronic logging device estimates and low-power wide area device estimates. The operations can further include determining that a GPS spoofing attack has occurred based on the electronic logging device estimates and the low-power wide area device estimates. The operations can further include creating a GPS spoofing alert for the mobile transportation equipment. In some embodiments, the operations can further include detecting that an off-duty driving mode was activated on the mobile transportation equipment, and obtaining a location obfuscation constraint parameter that defines an allowable deviation distance for the mobile transportation equipment. In some embodiments, in response to determining that a deviation distance exceeds the allowable deviation distance provided by the obfuscation constrain parameter, the operations can include generating corrected route data representing an actual location of the mobile transportation equipment during the spoofing attack. In some embodiments, in response to determining that a deviation distance does not exceed the allowable deviation distance provided by the obfuscation constrain parameter, the operations can include withholding the GPS spoofing alert from being provided to the electronic logging device until the deviation distance exceeds the allowable deviation distance. In some embodiments, the operations can include generating an hours of service correction command that includes the GPS spoofing alert, where the hours of service correction command instructs the electronic logging device to update an hours of service log with corrected route data and spoofing time identifiers corresponding to the spoofing attack.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
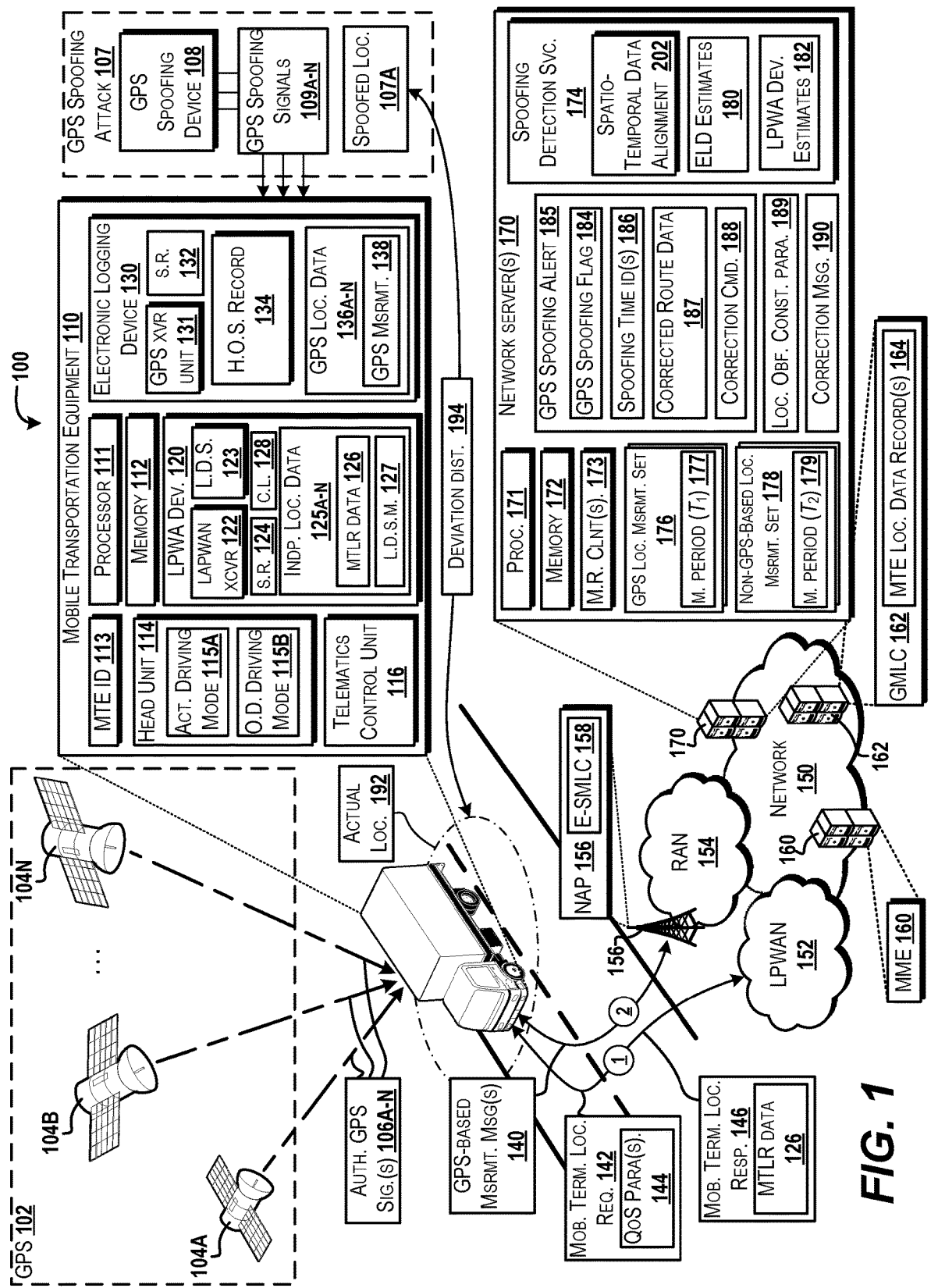
FIG. 1 is a block diagram illustrating an example operating environment for implementing global positioning system spoofing countermeasures, according to an illustrative embodiment.

The following detailed description is directed to global positioning system spoofing countermeasures, according to various embodiments. Business policies, industry standards, and government regulations have become a driving force in ensuring that vehicles and other transportation equipment are operated in a safe manner. In the product shipping industry, various government regulations may dictate how long a piece of equipment is allowed to be in use during a specific time interval, and thus mandatory periods of rest (i.e., non-movement) may be required. For example, the driver of a tractor-trailer or other Mobile Transportation Equipment ("MTE") may be mandated by law to take rest breaks during scheduled intervals, and thus the corresponding transportation vehicle and/or equipment is expected not to move while the driver is on-duty (i.e., performing duties to fulfil a required obligation of moving equipment and/or cargo). Public safety can be promoted by ensuring that the driver is adequately alert and focused for ensuring proper delivery and/or operation of transportation equipment, and thus some vehicles and/or other transportation equipment may be subject to government regulations, such as and Electronic Logging Device Mandate from the United States Federal Motor Carrier Safety Administration ("FMCSA"). To comply with various regulations, instances of an MTE may implement, or otherwise be outfitted with, an Electronic Logging Device ("ELD") that tracks, monitors, and/or otherwise generates a record of movement for the corresponding MTE at designated time intervals. In some embodiments, instances of an ELD may be required to provide an electronic Hours of Service ("HOS") record that includes instances of data that provides the location and velocity of the MTE for a particular time instance and/or interval. Instances of an ELD can include a GPS receiver unit that receives authentic GPS signals, which in turn are used to generate GPS-based location data that can be instantiated or otherwise recorded in the HOS record, thereby providing a log of location and/or velocity at an indicated time. Instances of an ELD are designed with the intent to be tamper-proof, specifically to prevent falsification of the GPS-based data within the HOS record that indicates the location, velocity, and/or time of operation of an MTE.

In various industries, an on-time and/or early arrival of products can be financially advantageous for one or more persons and/or entities. As such, some nefarious actors may seek to thwart government regulations by implementing a GPS spoofing attack, which attempts to manipulate or otherwise falsify data within the HOS record of an ELD, thereby potentially allowing an MTE to travel farther and/or faster than allowed by regulation without the unauthorized movement being recorded or otherwise logged by the ELD. Specifically, some nefarious actors may seek to implement or otherwise trigger a GPS spoofing attack via the use of a GPS spoofing device to generate GPS spoofing signals that provide false or otherwise inaccurate data to another device (e.g., an ELD of an MTE) that is within proximity of the GPS spoofing device and that is capable of receiving the GPS spoofing signals. A GPS spoofing device can include a transceiver that is configured to generate GPS spoofing signals at the same and/or similar frequency as authentic GPS signals provided by GPS satellites, but the GPS spoofing signals are transmitted at a higher transmitting power than the authentic GPS signals. In some implementations, the GPS spoofing device is configured to synchronize transmission of the GPS spoofing signals with the authentic GPS signals so as to mimic transmission operations of the GPS satellites, and thus in turn can cause a GPS spoofing attack to occur in a manner that is stealthy, that is not immediately detected by the ELD. As such, the GPS spoofing signals override or otherwise over-power the authentic GPS signals, thereby causing a receiving device (e.g., the GPS receiver unit of the ELD) to lock onto (i.e., redirect operations of the ELD so as to use the GPS signals transmitted at a higher power, which in this scenario would be the GPS spoofing signals) and analyze the GPS spoofing signals instead of the authentic GPS signals, and thus use whatever data is provided by the GPS spoofing device instead of data provided by authentic GPS signals from the GPS satellites. Therefore, a GPS spoofing device can attempt to manipulate or otherwise provide false GPS measurements and location information to one or more receiving devices and/or applications without physically tampering with the layout and/or configuration of the ELD.

Some traditional attempts to detect GPS spoofing attacks (i.e., detect when GPS spoofing signals are being received instead of authentic GPS signals) may include analyzing the GPS spoofing signal (and/or potential receipt of GPS spoofing signals) on the local receiving device while the GPS spoofing signal is being received on the local receiving device. Yet real-time signal processing on the local receiving device can be complex and demanding on computing resources, thereby causing an increased power drain, increased processor utilization, and decreased memory availability. In turn, the local device (e.g., an ELD) would have to be reconfigured with expensive components to handle the real-time, local signal processing, and thus may be impractical or otherwise not be feasible for large-scale, mass market deployment. Additionally, any GPS-receiving device that is within operating proximity of the GPS spoofing device (i.e., within transmission range of the GPS spoofing device) may also be affected by the GPS spoofing signals, and thus any GPS-based location information (which was generated from a device within proximity of the GPS spoofing device) may be inaccurate, incomplete, and/or infeasible to derive because the authentic GPS signals are being overpowered by the GPS spoofing device.

As such, embodiments of the present disclosure provide a Low-Power Wide Area ("LPWA") device that lacks a GPS receiver unit, and thus does not have GPS capability (i.e., does not have the ability to receive GPS signals, whether authentic or spoofing). The LPWA device can be configured as a cellular Internet of Things device that conforms to one or more Low-Power Wide Area Network radio protocols, which are discussed below in further detail. The LPWA device can use a narrow band communication path to request and obtain non-GPS-based location information from nodes of the cellular network. The LPWA device can also include a local device sensor that is configured as a barometric sensor and/or an altimeter. The LPWA device can use the local device sensor to obtain altitude measurements and data that is not based on GPS signals. The local device sensor and the non-GPS-based location information can form instances of independent location information. Yet because the LPWA device may be configured with a lower sampling rate than the sampling rate of the GPS receiver unit in the ELD, non-GPS-based location information is obtained less frequently than the GPS location data provided by the ELD. As a result, the independent location information may exhibit spatio-temporal misalignment. Aspects of the present disclosure can provide a GPS spoofing detection service that corrects the spatio-temporal misalignment and generates time-aligned estimates of location and velocity for the LPWA device, thereby allowing the GPS spoofing detection service to compare GPS-based location information with non-GPS-based location information. If the estimated location of the ELD deviates from the estimated location of the LPWA device beyond an allowable amount (where the allowable amount may be determined based on operations that provide statistical decisions and iterative hypothesis testing), then the GPS spoofing detection service can indicate that a GPS spoofing attack has occurred.

The GPS spoofing detection service can comply with various governmental privacy regulations by allowing for a deviation to occur within a defined amount when an MTE is operating or otherwise used for personal conveyance, such as when in an off-duty driving mode. By this, a location record may be obfuscated when the off-duty driving mode is activated while the MTE operates within the allowable deviation amount. In instances where the MTE is on-duty and/or the allowable deviation amount is exceeded, then the GPS spoofing detection service can generate correct location information so that corrected route data can be provided to the ELD. The GPS spoofing detection service can update a location data record for the MTE on the network, and in some embodiments, may send a message to the MTE to update or otherwise record that a GPS spoofing attack has occurred, such as via an update to the HOS record of the ELD. Therefore, the concepts and technologies of the present disclosure can provide non-GPS-based mechanisms for detecting a GPS spoofing attack in a manner that allows an ELD to accurately track the movement of the MTE while in the presence of a GPS spoofing device, thereby improving functionality of the ELD and maintaining operational security via the use of the LPWA device. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for global positioning system spoofing countermeasures will be disclosed, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 includes a Global Positioning System ("GPS") 102, a GPS spoofing device 108, a Mobile Transportation Equipment ("MTE"), such as an MTE 110, a communications network ("network") 150, a Low-Power Wide Area network ("LPWAN") 152, a radio access network ("RAN") 154, a network access point 156, a Mobility Management Entity ("MME") 160, a Gateway Mobile Location Center ("GMLC") 162, and a network server 170. The number of instances shown in FIG. 1 is for illustration purposes only and should not be construed as limiting in any way. Therefore, it is understood that zero, one, two, or more instances of each of the components shown in FIG. 1 may be provided in various embodiments.

In the operating environment shown in FIG. 1, the GPS 102 can include a plurality of GPS satellites, such as GPS satellites 104A-N. Each of the GPS satellites 104A-N can orbit around the earth and can be configured to generate, transmit, and provide an authentic GPS signal, such as any of the authentic GPS signals 106A-N, to any device that is within an area of coverage and capable of receiving the authentic GPS signals 106A-N. The instances of the authentic GPS signals 106A-N can be used by various GPS-based receiving devices to determine where the GPS-based receiving device is located. As such, in various embodiments, the authentic GPS signals 106A-N can provide accurate location data in the form of one or more instance of GPS measurements, such as GPS measurements 138. A GPS receiver unit (e.g., GPS receiver unit 131 discussed below) can receive messages (sent from the GPS satellites 104A-N) that include the GPS measurements 138 in the format of data sets that enable the GPS receiver unit 131 to derive or otherwise determine the location of the sending GPS satellite and time provided by the sending GPS satellite, which in turn can cause the GPS receiver unit 131 to estimate or otherwise determine its own location (i.e., a location of an ELD 130, which is used for the location of the MTE 110) and any location uncertainty values. The GPS measurements 138 can include data for latitude, longitude, altitude, a time stamp, uncertainty values for horizontal distances (e.g., measured in meters), uncertainty values for vertical distance, such as altitude (e.g., measured in meters), a confidence level for horizontal distances (i.e., percentage confidence level of the return position estimate), and/or a confidence level for vertical distance, such as for altitude distances.

The authentic GPS signals 106A-N can be used to determine an actual location 192 of the device receiving the authentic GPS signals 106A-N, such as an instance of an ELD 130 of the MTE 110. Therefore, an instance of the GPS measurements 138 can correspond with (or otherwise represent) the actual location 192 when the GPS measurements 138 are calculated or otherwise determined using only the authentic GPS signals 106A-N. As discussed in further detail below, an instance of the GPS measurements 138 can correspond with (or otherwise represent) a spoofed location (i.e., a location that is deliberately false, incorrect, or otherwise misleading and thus not the actual location 192), such as a spoofed location 107A, when the GPS measurements 138 are calculated or otherwise determined using one or more GPS spoofing signals, such as any of GPS spoofing signals 109A-N.

In some embodiments, the operating environment 100 can include one or more instances of the GPS spoofing device 108. The GPS spoofing device 108 can be configured so as to cause or otherwise implement a GPS spoofing attack, such as a GPS spoofing attack 107. A GPS spoofing attack 107 occurs when the GPS spoofing device 108 transmits one or more GPS spoofing signals 109A-N having false or otherwise inaccurate information so that a spoofed location 107A is reported and/or recorded by a receiving device (e.g., the ELD 130 of the MTE 110) instead of the actual location 192, thereby causing the ELD 130 to record information that appears as though the MTE 110 was at the spoofed location 107A, when in reality the MTE 110 was at the actual location 192. The spoofed location 107A refers to or otherwise represents a geographic location that is intentionally inaccurate or otherwise a deliberate misrepresentation of the actual location 192 of the corresponding receiving device (e.g., the ELD 130 and/or the MTE 110). The GPS spoofing device 108 can include any device that is configured to operate in a manner that causes (or attempts to cause) an instance of the GPS spoofing attack 107. For example, the GPS spoofing device 108 can include circuitry and a transmitter that is configured to generate the GPS spoofing signals 109A-N that provide data representing the spoofed location 107A.

In various embodiments, the GPS spoofing signals 109A-N may be configured at least similar to the authentic GPS signals 106A-N such that the ELD 130 may not recognize that the GPS spoofing signals 109A-N are being transmitted from the GPS spoofing device 108 instead of the GPS satellites 104A-N. For example, the GPS spoofing device 108 can be configured to transmit the GPS spoofing signals 109A-N on a channel that is used by one or more of the GPS satellites 104A-N (i.e., at a frequency that may be at least similar to and/or the same as the authentic GPS signals 106A-N transmitted by one or more of the GPS satellites 104A-N). The GPS spoofing signals 109A-N are transmitted at a higher power than the authentic GPS signals 106A-N, and therefore amplitude of the GPS spoofing signals 109A-N may be higher relative to the amplitude of the authentic GPS signals 106A-N. In various embodiments, the GPS spoofing signals 109A-N may affect any receiving device (capable of receive GPS signals) that is within transmission range of the GPS spoofing device 108.

In various embodiments, the ELD 130 may be configured to mitigate potential interruptions in location tracking by using the incoming GPS signals that have the highest signal strength. The GPS spoofing device 108 transmits the GPS spoofing signals 109A-N at a higher power than the authentic GPS signals 106A-N transmitted by the GPS satellites 104A-N. As such, the GPS spoofing signals 109A-N will be interpreted by the ELD 130 as having a higher signal strength than the authentic GPS signals 106A-N. Therefore, the ELD 130 may use the GPS spoofing signals 109A-N instead of the authentic GPS signals 106A-N. The GPS spoofing device 108 can configure one or more of the GPS spoofing signals 109A-N such that an instance of the GPS measurements 138 recorded by the ELD 130 represents inaccurate or otherwise false measurements (e.g., alternate latitude, alternate longitude, alternate altitude, alternate time stamp, alternate uncertainty values, alternate confidence levels, etc.). Therefore, when an instance of the GPS measurements 138 is recorded by the ELD 130 based on one or more of the GPS spoofing signals 109A-N, that instance of the GPS measurements 138 can represent or otherwise correspond to the spoofed location 107A instead of the actual location 192 of the MTE 110.

The operating environment 100 can include one or more instance of the MTE 110. In some embodiments, instances of the MTE 110 can be configured as equipment that enables the transportation of persons and/or property, such as but not limited to, one or more of a ground-based vehicle that is capable of receiving GPS signals and is capable of communicating with the LPWAN 152 (e.g., a car, a truck, a van, a limousine, a railroad car and/or locomotive, a bus, a semi-trailer truck, a trailer, a truck trailer, cargo shipping containers, snow-capable vehicles, earth-moving equipment, farming/agriculture equipment, a motorcycle, a tricycle, or any other ground-based vehicle that is subject to a mandate or regulation to provide electronic logging), an air-based vehicle that is capable of receiving GPS signals and is capable of communicating with the LPWAN 152 (e.g., an unmanned aircraft vehicle, a remote-controlled vehicle, and/or any other flying vehicle that is configured to receive GPS signals and communicate with a low-power wide area network), a user equipment (e.g., a smart phone, a tablet, a laptop, a component of a smart home such as a smart appliance, and/or any other user equipment that is configured to receive GPS signals and capable of communicating with a low-power wide area network), and/or any other device that is configured with an instance of the ELD 130 that can receive GPS signals for location determination. In some embodiments, an instance of the MTE 110 can include vehicle components for mechanical and/or electrical functions (e.g., engine, drivetrain, electrical system, etc.), a vehicle processor, a vehicle memory, a vehicle firmware, a vehicle operating system and/or safety system, an electronic control unit, one or more vehicle software applications, a display device, an input/output component, a vehicle wireless communications component (e.g., radio components), an instance of a vehicle communication interface (e.g., to implement a vehicle-to-everything communication scheme), and/or other mechanical, electrical, and/or hydraulic components that facilitate function of the MTE 110.

In various embodiments, an instance of the MTE 110 can include a processor 111, a memory 112, a head unit 114, a telematics control unit ("TCU") 116, a low-power wide area device ("LPWA device") 120, and an electronic logging device ("ELD"), such as the ELD 130. The processor 111 can include one or more instance of a processing unit and/or processing circuitry. In various embodiments, an instance of the processor 111 can be configured at least similar and/or identical to an instance of a processing unit discussed below with respect to FIG. 6. In various embodiments, an instance of the memory 112 can include one or more instance of a data storage device. In some embodiments, the memory 112 can include volatile and/or non-volatile memory implemented in any method or technology for storage of information, where the information can be configured in a form such as computer-executable instructions, data structures, software program modules, or other data disclosed herein. It is understood that, in the claims use of the term "memory" and "computer storage medium" and variations thereof does not include, and shall not be construed to include, a wave or a signal per se and/or communication media. The memory 112 can be configured substantially similar to memory discussed further below with respect to FIG. 6. It should be understood that the examples provided are for illustration purposes only, and therefore should not be construed as limiting in any way.

In various embodiments, an instance of the MTE 110 can be identified or otherwise correspond to an equipment identifier, such as an MTE identifier 113. In some embodiments, the MTE identifier 113 may be assigned and/or correspond to one or more components of the MTE 110, such as the ELD 130 and/or the LPWA device 120. By this, the various network devices (e.g., the network server 170) and/or services of the operating environment 100 may determine an identity of the MTE 110 and/or corresponding components (e.g., the LPWA device 120 and/or the ELD 130) based on the MTE identifier 113. As such, in some embodiments, messages, requests, responses, and/or communications to and/or from the MTE 110 may include an instance of the MTE identifier 113 for use in identification purposes. Examples of the MTE identifier 113 can include, but are not limited to, a serial number, an International Mobile Subscriber Identifier ("IMSI"), a Mobile Equipment Identifier ("MEID"), a telephone number, a vehicle identification number ("VIN"), an Internet Protocol address, a profile number, an address, a user-name, or one or more strings indicating a unique identity of the MTE 110 and/or any component associated therewith (e.g., the LPWA device 120 and/or the ELD 130). It should be understood that the examples provided are for illustration purposes only, and therefore should not be construed as limiting in any way.

In various embodiments, an instance of the MTE 110 can include an instance of the head unit 114. The head unit 114 can include one or more instances of a processor, memory, circuitry, and/or a display device for presenting a user interface that can provide visual images and/or audiovisual input and output. The head unit 114 also can include (and/or be communicatively coupled to) input and output components that provide audio input/output (e.g., via one or more speakers and/or microphones) and receive input and/or provide output to/from a user (e.g., via a touchscreen of the display device, a projector, visual indicators, buttons, switches, haptic feedback units, etc.). In some embodiments, the head unit 114 can be configured to include a heads-up display, a vehicle information display, a console display, blind spot alert mechanisms, a projector, a combination thereof, or any other audio, visual, and/or haptic feedback mechanism that can communicate or convey information to a user associated with the MTE 110 and/or a component therein (e.g., the LPWA device 120 and/or the ELD 130). In some embodiments, information and data pertaining to the current and/or previous location of the MTE 110 can be provided or otherwise presented to a user via the head unit 114 through visual presentation and/or audio presentation via one or more user interface. In some embodiments, the head unit 114 can be fixed within the MTE 110 and/or be configured as a removeable device. In some embodiments, the head unit 114 can comprise one or more components of the MTE 110 (e.g., the LPWA device 120 and/or the ELD 130), and thus in some embodiments, one or more components of the MTE 110 may share a housing with the head unit 114. It should be understood that the examples provided are for illustration purposes only, and therefore should not be construed as limiting in any way.

In various embodiments, aspects of the present disclosure can provide tracking obfuscation using dynamic, scalable location accuracy during the presence of a GPS spoofing attack (discussed in further detail below) so as to mitigate driver harassment and promote privacy protection, thereby complying with requirements of a regulatory entity, such as but not limited to an ELD mandate from the FMCSA. For example, in various embodiments, a component of the MTE 110 (e.g., the head unit 114 and/or the ELD 130) can provide a user interface that enables a user (e.g., a driver of the MTE 110) to select (or otherwise provide input corresponding to) one or more operating modes, such as but not limited to, an active driving mode 115A and/or an off-duty driving mode 115B. In some embodiments, while the MTE 110 is being used for personal conveyance (e.g., while the driver of the MTE 110 is off-duty and is using the MTE 110 for personal use), a regulatory mandate may require that the precision of tracking the location of the MTE 110 must decrease or otherwise be obfuscated so that the precise location of the MTE 110 is tracked, logged, or otherwise recorded according to a broader area, such as by the location of the MTE 110 being recorded as being within a defined amount (e.g., a ten miles radius) from the actual location of the equipment being tracked (e.g., the MTE 110). The defined amount which the precision should be decreased can be defined by a location obstruction constraint parameter ("LOCP"), such as an LOCP 189. For example, in some embodiments, when the active driving mode 115A is activated, the precision for location tracking and/or logging may be within one foot of the actual location 192 of the MTE 110, but when the off-duty driving mode 115B is activated, the precision for location tracking and/or logging may decrease as defined by the LOCP 189, such as within ten miles of the actual location 192 of the MTE 110. It is understood that a decrease in precision yields an increase in the generalization of the location reported. Therefore, in various embodiments, each of the active driving mode 115A and the off-duty driving mode 115B can trigger one or more operations and/or configurations that can affect how an instance of the ELD 130 records movement and location data regarding the position, velocity, and/or time which the MTE 110 is being used. The driver (or another user) corresponding to the MTE 110 can indicate when the MTE 110 is being used for personal conveyance (and/or to otherwise to indicate that the MTE 110 is no longer on-duty and thus the MTE 110 is not being used in an official capacity) by selecting or otherwise activating the off-duty driving mode 115B. When the active driving mode 115A is activated (and thus the MTE 110 is on-duty), location tracking and logging should occur without tracking precision constraints (i.e., without applying the LOCP 189). When the off-duty driving mode 115B is activated (and thus the MTE 110 is not in use and/or being used for personal conveyance), the LOCP 189 may be applied to location data, which in turn can cause the ELD 130 to track or otherwise report the location of the MTE 110 with less precision than normal (i.e., less precision than when in active driving mode 115A), such as according to the distance amount defined by the LOCP 189 (e.g., recording the location according to a 10 mile radius instead of within a normal one foot radius of the actual location 192). It should be understood that the examples provided are for illustration purposes only, and therefore should not be construed as limiting in any way.

In some embodiments, an instance of the MTE 110 can include a telematics control unit ("TCU"), such as the TCU 116. The TCU 116 can include communication components and circuitry that provide and support communicative coupling with other devices and/or networks, such as but not limited to, the network 150, the LPWAN 152, the RAN 154, the MME 160, the GMLC 162, and/or the network server 170. In some embodiments, the TCU 116 can send, receive, and/or control communication flow to/from the head unit 114 and/or another component of the MTE 110, although this may not necessarily be the case. In some embodiments, the TCU 116 may include, or otherwise communicate with, an instance of the ELD 130. As such, in some embodiments, the TCU 116 may be capable of receiving GPS signals (e.g., the authentic GPS signals 106A-N and/or the GPS spoofing signals 109A-N). In some embodiments, the TCU 116 can provide a wireless interface for mobile communication (e.g., GSM, GPRS, Wi-Fi, WiMax, 2G, 3G, 4G, LTE, 5G NR, etc.) to provide communicative coupling or otherwise enable and facilitate communication with the RAN 154 and/or the network 150. In some embodiments, the TCU 116 can indicate an amount of cellular signal strength, available network connections, and other information pertaining to communication to/from and/or network location of the MTE 110. In some embodiments, information provided by the TCU 116 can be presented to a user via the head unit 114. The TCU 116 can expose one or more network communication interfaces that provide cellular communication paths to a network access point, such as a communication path 2

(which may be a broad-band path) between the network access point 156 and the MTE 110. It should be understood that the examples provided are for illustration purposes only, and therefore should not be construed as limiting in any way.

In various embodiments, the operating environment 100 can include an instance of the ELD 130. The ELD 130 can, in some embodiments, be included in, or otherwise correspond to, an instance of the MTE 110. In some embodiments, the ELD 130 is activated and can provide location tracking whenever the MTE 110 is powered on and/or can be integrally synchronized with the engine (or other motor) of the MTE 110. The ELD 130 can be configured to provide hour of service recordation and location tracking so as to conform to a regulatory mandate, such as a mandate, rule, and/or requirement from a government agency. The ELD 130 can include a GPS receiver unit, such as a GPS receiver unit 131. The GPS receiver unit 131 refers to any device that is capable of receiving GPS signals (e.g., any of the authentic GPS signals 106A-N and/or the GPS spoofing signals 109A-N). The GPS receiver unit 131 can include a processor, a memory, and/or circuitry that enables determination as to the current location of the ELD 130. Therefore, when the ELD 130 is included in and/or traveling with the MTE 110, the ELD 130 can serve to determine, track, and record the current location of the MTE 110. In various embodiments, when the GPS receiver unit 131 receives and analyzes GPS signals (e.g., any of the authentic GPS signals 106A-N and/or the GPS spoofing signals 109A-N), one or more instances of GPS measurements 138 can be determined and recorded during a defined time instance, which is based on a sampling rate 132 of the GPS receiver unit 131. For example, in some embodiments, the sampling rate 132 may indicate that an instance of the GPS measurements 138 are determined every 500 milliseconds.

In various embodiments, an instance of the GPS measurements 138 for a particular time instance can be formatted and stored as an instance of GPS location data, such as GPS location data 136A-N. The GPS location data 136A-N includes instances of the GPS measurements 138, and therefore includes data discussed above with respect to the GPS measurement 138. In various embodiments, one or more of the instances of the GPS location data 136A-N can pertain or otherwise reflect information about the spoofed location 107A based on an instance of the GPS measurements 138 being received from the GPS spoofing device 108 via the GPS spoofing signals 109A-N. In various embodiments, one or more of the instances of the GPS location data 136A-N can pertain or otherwise reflect information about the actual location 192 of the MTE 110 based on an instance of the GPS measurements 138 being received from the GPS satellites 104A-N. The GPS location data 136A-N can be stored or otherwise recorded in an Hours of Service ("HOS") record, such as an HOS record 134. In some embodiments, the HOS record may be referred to as an HOS log. The HOS record 134 can indicate or otherwise provide a record of activity pertaining to the MTE 110 by obtaining and recording information at every defined time interval, such as provided by the sampling rate 132. For example, in some embodiments, the HOS record 134 can record or otherwise include any of date information, time and location information (e.g., time and location information provided by the GPS location data 136A-N through various instances of the GPS measurements 138), engine hours, vehicle miles (i.e., odometer readings from the MTE 110), driver identification information (e.g., a driver's name, license number, etc.), authenticated user information (e.g., an instance of the MTE identifier 113), information about the MTE 110 (e.g., make, model, type, etc.), information about a motor carrier (i.e., information about an entity associated with the MTE 110), a combination thereof, or the like.

In various embodiments, the ELD 130 can report or otherwise provide the GPS location data 136A-N, and/or any other information included in the HOS record 134, to the network 150 at a designated measurement period, such as a measurement period 177. In some embodiments, the measurement period 177 may be referred to as a first measurement period ($T_1$). Specifically, the ELD 130 and/or another component of the MTE 110 (e.g., the TCU 116) can send a GPS-based measurement message 140 to the network access point 156 of the RAN 154 via the communication path 2. In some embodiments, the communication path 2 can provide an air interface that supports voice calls and/or data calls to a cellular network (e.g., a Uu interface with the RAN 154). The network access point 156 can relay the GPS-based measurement message 140 to the MME 160 via the RAN 154, which in some embodiments may occur using an S1 interface, although this may not necessarily be the case. The MME 160 can relay the GPS-based measurement message 140 to the GMLC 162, which may occur via a SLg interface, although this may not necessarily be the case. The GPS-based measurement message 140 can be addressed or otherwise directed to the GMLC 162, which can be configured to store or otherwise record instances of the GPS-based measurement messages 140 (along with the GPS location data 136A-N included therein) in an MTE location data record, such as an MTE location data record 164. The MTE location data record 164 can be accessed by one or more users and/or administrators via the network 150, and therefore can allow for information about the MTE 110 to be determined on demand via a network portal. In various embodiments, the MTE location data record 164 can include a GPS location measurement set 176 and a non-GPS-based location measurement set 178. The GPS location measurement set 176 can include the GPS location data 136A-N over various time instances as the GPS-based measurement messages 140 are received. In various embodiments, the GPS location measurement set 176 can be updated at a time defined by the measurement period 177.

In various embodiments, the MTE 110 can include an instance of the LPWA device 120. The LPWA device 120 can include an LPWA network ("LPWAN") transceiver 122 and a local device sensor 123. The LPWA device 120 can be configured to provide communicative coupling, via the LPWAN transceiver 122, in accordance with one or more Low-Power Wide Area Network radio protocols, such as Narrow Band Internet of Things ("NB-IoT") that can include LTE Cat NB1 and LTE Cat NB2; LTE-M that can include LTE Category X ("Cat X," where x corresponds to a technical standard release, such as Cat-1, Cat-2, etc.), LTE Category MX ("LTE Cat-MX," where x corresponds to a technical standard release, such as LTE Cat M1, LTE Cat M2, etc.); Extended Coverage IoT optimized GSM network ("EC-GSM"), a combination thereof, or the like. In various embodiments, the LPWAN transceiver 122 may not support or otherwise provide a streaming, continuous, or otherwise prolonged connection with the LPWAN 152 because the LPWAN transceiver 122 may be configured to reduce power consumption by limiting communications to intermittent sending and receiving of between the LPWA device 120 and the LPWAN 152. As such, the LPWA device 120 can communicate with the LPWAN 152 via a communication path 1, where the communication path 1 provides a narrow band path. In various embodiments, the narrow band path is not used continuously and thus may not support voice calls and/or a continuous streaming connection with the LPWAN 152. In some embodiments, a narrow band path, such as the communication path 1 of the operating environment 100, can correspond to or otherwise provide support for a device receiving bandwidth within a range of 1.4-20 MegaHertz ("MHz"), such as may be provided by protocols and specifications for LTE-M. In other embodiments, a narrow band path can correspond to or otherwise provide support for a system bandwidth of 200 kiloHertz ("kHz"). In some embodiments, a narrow band path may correspond to or otherwise provide support for a system bandwidth of less than 200 kHz, such as 180 kHz. In various embodiments, the LPWAN transceiver 122 may be configured to support burst-type communications (i.e., not sustained) along the narrow band path (e.g., the communication path 1), and therefore the LPWAN transceiver 122 may power-on (or otherwise activate) long enough to send and/or receive communications (e.g., the mobile terminal location request 142 and/or the mobile terminal location response 146) at defined intervals (e.g., a measurement period 179 discussed herein). The LPWA device 120 may be configured to operate so as to conserve power and/or operate on an intermittent basis and/or ad hoc basis, and thus may be considered a "low power" device. As such, in some embodiments, the LPWAN transceiver 122 may not support voice calls and/or continuous data sessions. In contrast, the MTE 110 and/or the ELD 130 may utilize the TCU 116 to communicate, via the communication path 2, at an ongoing basis (i.e., continuous communication). As such, the ELD 130 can provide GPS-based measurement messages 140 using the communication path 2 that supports communications in a continuous, constant, or otherwise frequent manner. This may be because the communication path 2 is capable of a higher-bandwidth than the communication path 1, such as due to the communication path 2 connecting to the network access point 156 that supports an active, ongoing, voice and/or data session between the MTE 110 and the RAN 154, while the communication path 2 does not support continuous voice calls and/or streaming session due to its lower-bandwidth and connection to the LPWAN 152. Stated simply, the ELD 130 and the TCU 116 may communicate using a communication path (e.g., the communication path 2) that supports industry standard protocols for cellular communication that are not specific to IoT devices (e.g., 2G, 3G, 4G, LTE, etc.), while the LPWA device 120 can operate as a cellular IoT device that uses the LPWAN transceiver 122 to communicate at infrequent intervals, and therefore utilize narrow band paths (e.g., the communication path 1) to interact with the LPWAN 152. It should be understood that the examples provided are for illustration purposes only, and therefore should not be construed as limiting in any way.

In various embodiments, the LPWA device 120 is configured without GPS capability, that is, without having components that are capable of receiving GPS signals, such as any of the authentic GPS signals 106A-N and/or the GPS spoofing signals 109A-N. Therefore, the LPWA device 120 may not include an instance of the GPS receiver unit 131. In various embodiments, the LPWA device 120 is configured without GPS capability in order to reduce power consumption and decrease the amount of processing resources, memory resources, and/or transceiver components being implemented for operation. By this, the LPWA device 120 can serve as a mobile IoT device, a cellular IoT device, Narrow Band IoT device, or any other device that is configured to operate, communicate, or otherwise interact with the LPWAN 152 and perform the operations discussed herein.

In various embodiments, the LPWA device 120 can, independent from the ELD 130, estimate, verify, and/or otherwise confirm the actual location 192 (currently and/or previously) of the MTE 110 without relying on, or otherwise receiving, GPS signals, such as any of the authentic GPS signals 106A-N and/or the GPS spoofing signals 109A-N. Specifically, the LPWA device 120 can be configured to obtain and/or generate independent location data, such as independent location data 125A-N, for use in estimating location of the MTE 110 and detecting an instance of the GPS spoofing attack 107. Instances of the independent location data 125A-N are not GPS-based (i.e., not generated or otherwise determined based on the use of GPS signals) because the LPWA device 120 does not receive GPS signals. In various embodiments, the independent location data 125A-N can be generated by the LPWA device 120 less often than the ELD 130 generates the GPS location data 136A-N. Specifically, the LPWA device 120 has a sampling rate 124 that is less than the sampling rate 132 of the ELD 130. For example, in some embodiments, the GPS receiver unit 131 of the ELD 130 creates and records instances of the GPS location data 136A-N every 250 milliseconds, or another rate defined by the sampling rate 132. The LPWA device 120 may have a sampling rate 124 configured to be a few orders of magnitude less than the sampling rate 132 of the ELD 130, and therefore instances of the independent location data 125A-N are generated, measured, and/or recorded less often. In some embodiments, the sampling rate 124 of the LPWA device 120 may be referred to as an independent location data sampling rate and the sampling rate 132 of the GPS receiver unit 131 (and thus for ELD 130) may be referred to as a GPS location data sampling rate.

In various embodiments, instances of the independent location data 125A-N can include an instance of mobile terminal location response data 126 and one or more instance of a local device sensor measurement 127. Each instance of the independent location data 125A-N can correspond to a particular time instance when non-GPS-based measurements and/or data are obtained and recorded, such as defined by the sampling rate 124. Instances of the local device sensor measurement 127 can be generated and obtained by the local device sensor 123, which is not capable of receiving GPS signals. The local device sensor 123 can include an altimeter and/or a barometer. In some embodiments, the local device sensor 123 may configured so as to be insensitive to changes in acceleration, force, and/or, and therefore the local device sensor 123 may, in some embodiments, not be considered or otherwise configured as an inertial measurement unit. An instance of the local device sensor measurement 127 can include one or more of a time stamp indicating the time when altitude and/or pressure data is determined, an altitude coordinate, a pressure value, an uncertainty value corresponding to the altitude coordinate, and/or a confidence level for the altitude coordinate.

In various embodiments, the mobile terminal location response data 126 includes data that is non-GPS-based, and therefore can provide location information that serves to independently determine, estimate, or otherwise identify the actual location 192 of the MTE 110, and in turn can be used to detect an instance of the GPS spoofing attack 107. Instances of the mobile terminal location response data 126 can include one or more of a time stamp (i.e., date and time when the measurements for the location of the LPWA device 120 were collected), a terminal latitude coordinate, a terminal longitude coordinate, an altitude coordinate, an accuracy value (e.g., a first horizontal uncertainty measurement and/or a second horizontal uncertainty measurement, which may be measured in meters), a first horizontal confidence level, and/or a second horizontal confidence level. In various embodiments, the mobile terminal location response data 126 can be joined with the local device sensor measurements 127 to form an instance of the independent location data 125A-N. To generate and/or obtain the mobile terminal location response data 126 without reliance on GPS signals, the LPWA device 120 can generate and send a mobile terminal location request 142 to an evolved serving mobile location center ("E-SMLC"), such as an E-SMLC 158, via the LPWAN 152. The mobile terminal location request 142 can request that a network node (e.g., the E-SMLC 158) determine location information for a mobile device (e.g., the LPWA device 120) without relying on GPS signals (e.g., via use of a non-GPS-based network mechanism, such as a mobile terminal location response that is triggered by the LPWA device 120 that is configured without GPS capability). The LPWA device 120 may limit the information provided in the mobile terminal location request 142 to quality of service parameters 144, thereby allowing components of the network (e.g., the E-SMLC 158) to determine which non-GPS positioning mechanism should be implemented in order to return the mobile terminal location response data 126 to the LPWA device 120. For example, the quality of service parameters 144 may include the MTE identifier 113 (which the E-SMLC 158 can use to identify the MTE 110 and/or the LPWA device 120 within the RAN 154 and/or the LPWAN 152), a requested accuracy indicator (e.g., a preferred level of accuracy for location data, which may be indicated in meters from 1-100, where an accuracy indicator of 1 meter is more accurate than 100 meters), and a maximum time delay (e.g., number of seconds that is allowed to elapse, which may correlate with the sampling rate 124 of the LPWA device 120. The mobile terminal location request 142 can be sent along the communication path 1, and relayed from the MME 160 to the E-SMLC 158. In some embodiments, the E-SMLC 158 may be supported and/or hosted by the network access point 156, the network server 170, and/or another computing system of the RAN 154, the network 150, and/or the LPWAN 152. In some embodiments, the E-SMLC 158 may determine the mechanism by which to independently locate the LPWA device 120 within the RAN 154 without using GPS signals, which in turn enables the E-SMLC 158 to provide the mobile terminal location response data 126 to the LPWA device 120. For example, to generate the mobile terminal location response data 126, the E-SMLC 158 may implement non-GP S-based positioning mechanisms via one or more instances of the network access point 156, such as one or more of enhanced cellular identification, observed time difference of arrival, adaptive enhanced cell identity fingerprinting, or another network-based operation that does not rely on GPS signals. The E-SMLC 158 can use one or more instances of the network access point 156 to obtain non-GPS-based location measurements and information, such as the data and information discussed for the mobile terminal location response data 126. As such, in some embodiments, the mobile terminal location response data 126 may represent coordinates and information from the perspective of the LPWAN 152, thereby providing independent location information that does not rely on GPS signals and does not require the LPWA device 120 to self-determine its current location. The mobile terminal location response data 126 can be included in a mobile terminal location response 146, which can be provided back to the LPWA device 120 along another instance of the communication path 1. In turn, the LPWA device 120 can extract the instance of the mobile terminal location response data 126 for inclusion in an instance of the independent location data 125A-N for a specific time instance.

In various embodiments, the LPWA device 120 can report instances of the independent location data 125A-N to the GMLC 162 at a defined interval, such as a measurement period 179. The measurement period 179 may be referred to as a second measurement period ($T_2$). The measurement period 179 corresponds to how often the independent location data 125A-N is reported to the GMLC 162. Instances of the independent location data 125A-N can be stored in the MTE location data record 164 corresponding to the MTE 110. Because the independent location data 125A-N is distinct from the GPS location data 136A-N, the MTE location data record 164 may store the independent location data 125A-N in a non-GPS-based location measurement set 178. The non-GPS-based location measurement set 178 can be updated with an incoming instance of the independent location data 125A-N, as defined by the amount of time indicated in the measurement period 179. Therefore, the non-GPS-based location measurement set, such as the non-GPS-based location measurement set 178 can include the independent location data 125A-N received from the LPWA device 120, while the GPS location measurement set 176 can include the GPS location data 136A-N received from the ELD 130. Because the independent location data 125A-N is reported to the GMLC 162 at different time intervals than the GPS location data 136A-N (i.e., because the measurement period 179 is different that the measurement period 177, specifically the measurement period 179 being longer than the measurement period 177, resulting in the independent location data 125A-N being reported less frequently), the independent location data 125A-N will have a time misalignment relative to the GPS location data 136A-N. Additionally, the independent location data 125A-N can exhibit a spatial misalignment relative to the GPS location data 136A-N because the independent location data 125A-N was not generated using GPS signals (e.g., the authentic GPS signals and/or the GPS spoofing signals 109A-N), and therefore the information included in the independent location data 125A-N may include different position, velocity, altitude, accuracy, and/or other information relative to the GPS measurements 138 of the GPS location data 136A-N. Therefore, when the information provided by the independent location data 125A-N and the GPS location data 136A-N exhibits a temporal misalignment and a spatial misalignment, then a spatio-temporal misalignment exists. In various embodiments, a spatio-temporal misalignment between the independent location data 125A-N and the GPS location data 136A-N can be detected by one or more instances of the network server 170, such as discussed below.

In various embodiments, the operating environment 100 can include one or more instances of the network server 170. The network server 170 can include one or more instances of a processor 171 and a memory 172. Instances of the processor 171 can be configured substantially similar to the processor 111 and/or a processor discussed with respect to FIG. 6. Instances of the memory 172 can be configured substantially similar to the memory 112 and/or memory discussed with respect to FIG. 6. In various embodiments, one or more instances of the network server 170 can support, host, or otherwise provide a spoofing detection service 174. The spoofing detection service 174 may be configured as a software platform that is hosted by one or more computing systems to manage detection of GPS spoofing attacks and provide countermeasures, such as in the form of correction commands discussed below in further detail. It is understood that the use of the term "service" is intended to correspond with one or more network operations that support handling of communications, messages, and/or instructions for detection of GPS spoofing attacks on various equipment. Therefore, any use of the term "service" in the claims shall not be construed or interpreted as being direct to, involving, or otherwise including a judicial exception (e.g., an abstract idea, an idea of itself, an economic process, etc.) or any other non-patentable subject matter. As such, use of the term "service" shall be construed within the realm of technology as understood by one of ordinary skill in technology. It should be understood that the examples provided are for illustration purposes only, and therefore should not be construed as limiting in any way.

In some embodiments, the spoofing detection service 174 can be configured to provide a software-as-a-service such that various users can supplement asset and/or fleet tracking with detection of GPS spoofing attacks, such as the GPS spoofing attack 107, thereby mitigating against potential regulatory violations. In some embodiments, the spoofing detection service 174 can be provided on behalf of a mobile network operator and/or a communication service provider that supports tracking equipment via instances of the ELD 130. In various embodiments, the spoofing detection service 174 can provide computer-executable instructions that facilitate execution and performance of the various operations discussed herein. The spoofing detection service 174 can operate to detect instances of the GPS spoofing attack 107, and in some embodiments, can correct and/or supplement the HOS record 134 so that accurate location information can be recorded and logged by the ELD 130. In various embodiments, the spoofing detection service 174 can implement one or more software managers, modules, tools, filters, and/or clients that collect data and perform analysis. For example, in some embodiments, the spoofing detection service 174 can include one or more measurement reporting clients 173. In some embodiments, an instance of the measurement reporting clients 173 can be configured as a value added services location services client. In some embodiments, an instance of the measurement reporting clients 173 may be in charge, or otherwise manage, collecting and updating the MTE location data records 164 with incoming data from the LPWA device 120 and/or the ELD 130.

In various embodiments, the spoofing detection service 174 can perform or otherwise provide spatio-temporal data alignment, such as spatio-temporal data alignment 202, which will be discussed in further detail with respect to FIG. 2. When the independent location data 125A-N is received from the LPWA device 120, a direct comparison against the GPS location data 136A-N may not be available because of the spatio-temporal misalignment. As such, the spoofing detection service 174 can reconfigure and transform the independent location data 125A-N so as to enable a direct comparison with the GPS location data 136A-N, thereby enabling detection for the GPS spoofing attack 107. In various embodiments, when the spoofing detection service 174 provides the spatio-temporal data alignment 202, position and velocity estimates, along with variances at different confidence levels can be generated for the ELD 130 and the LPWA device 120, such as ELD estimates 180 and LPWA device estimates 182. The LPWA device estimates 182 can be time-aligned with the ELD estimates 180, and one or more operations can be performed to analyze the ELD estimates 180 and the LPWA device estimates 182 for detection of the GPS spoofing attack 107. The spoofing detection service 174 can use the ELD estimates 180 and the LPWA device estimates 182 to determine whether a deviation distance exists, such as a deviation distance 194. The ELD estimates 180 can provide an estimated location for the ELD 130 (which may be referred to as an ELD location estimate, such as discussed with respect to FIG. 2), and the LPWA device estimates 182 can provide an estimated location for the LPWA device 120 (which may be referred to as an LPWA device location estimate, such as discussed with respect to FIG. 2). The deviation distance 194 can represent or otherwise correspond to the distance between the ELD location estimate and LPWA device location estimate. In some embodiments, the deviation distance 194 may be compared against a location obfuscation constraint parameter ("LOCP"), such as the LOCP 189. The LOCP 189 can indicate an allowable deviation distance, that is an amount of distance between the LPWA device location estimate and the ELD location estimate that is permitted or otherwise is not enough to indicate that the GPS spoofing attack 107 has occurred.

For example, in some embodiments, the LOCP 189 may be defined as 10 miles, such that if the deviation between the LPWA device location estimate and ELD location estimate is less than 10 miles, then the deviation distance 194 would not exceed the LOCP 189, and therefore the spoofing detection service 174 may not (yet) consider an instance of the GPS spoofing attack 107 to have occurred. If the deviation distance 194 meets or exceeds the LOCP 189, then the spoofing detection service 174 may consider the GPS spoofing attack 107 to have occurred. In situations where a GPS spoofing attack 107 is determined to have occurred, the spoofing detection service 174 may consider the LPWA device location estimate to correspond with the actual location 192 and the ELD location estimate to correspond with the spoofed location 107A. Therefore, the spoofing detection service 174 can consider or otherwise determine that the instance of the GPS location data 126A-N that corresponds with the ELD location estimate was generated based on the GPS spoofing signals 109A-N and not the authentic GPS signals 106A-N. Further discussion of the ELD estimates 180 and the LPWA device estimates 182 is provided below with respect to an embodiment of the spatio-temporal data alignment 202 illustrated in FIG. 2.

In various embodiments, the spoofing detection service 174 can indicate whether a GPS spoofing attack 107 has occurred via instantiation of a GPS spoofing flag, such as a GPS spoofing flag 184. The GPS spoofing flag 184 can be set so as to indicate that an instance of GPS location data (e.g., among any of the GPS location data 136A-N) was generated using the GPS spoofing signals 109A-N, and therefore corresponds with the spoofed location 107A instead of the actual location 192 that would have been provided by the authentic GPS signals 106A-N. When an instance of the GPS spoofing flag 184 is set to indicate the GPS spoofing attack 107, a spoofing time identifier 186 may be provided or otherwise instantiated so as to indicate the time intervals that the GPS spoofing attack 107 occurred, and in turn can provide a pointer to the one or more instances of the GPS location data 136A-N that were inaccurate and affected by the GPS spoofing signals 109A-N. In various embodiments, the spoofing detection service 174 can use the results of the spatio-temporal data alignment 202, such as one or more instances of the LPWA device estimates 182, to generate corrected route data, such as corrected route data 187. The corrected route data 187 can be generated by the spoofing detection service 174 obtaining, from the non-GPS-based location measurement set 178, instances of the independent location data 125A-N that correspond with the spoofing time identifier 186 (i.e., corresponds with the time during which the GPS spoofing attack 107 occurred). The corrected route data 187 can use one or more instances of the mobile terminal location response data 126 and/or the local device sensor measurements 127 (which can be extracted from the independent location data 125A-N) to indicate the actual location 192 of the MTE 110. The corrected route data 187 can include information such as, the actual location 192 corresponding to the spoofing time identifier 186 (e.g., latitude, longitude, altitude), velocity, and one or more time stamps indicating the duration of the GPS spoofing attack 107 (e.g., provided by the spoofing time identifier 186).

In some embodiments, the spoofing detection service 174 can issue or otherwise generate a GPS spoofing alert 185. The GPS spoofing alert 185 can provide an indication that an instance of the GPS spoofing attack 107 as occurred. In some embodiments, the GPS spoofing alert 185 can be recorded in the MTE location data records 164 for the MTE 110. In some embodiments, the GPS spoofing alert 185 can be sent to the MTE 110. Specifically, the GPS spoofing alert 185 can be addressed to the LPWA device 120 and/or the ELD 130 of the MTE 110. The GPS spoofing alert 185 can include one or more of the GPS spoofing flag 184, instances of the spoofing time identifier 186, the corrected route data 187, and/or a correction command 188 (which will be discussed in further detail below). In some embodiments, the GPS spoofing alert 185 may be stored in a correction log 128 of the LPWA device 120. The correction log 128 can instantiate the GPS spoofing alert 185 in a memory of the MTE 110 (e.g., the memory 112) so as to provide a local recordation on the MTE 110. In some embodiments, the spoofing detection service 174 can configure the GPS spoofing alert 185 to withhold audiovisual presentation of the GPS spoofing alert 185 to a user of the MTE 110, such as by configuring the GPS spoofing alert 185 so as not to be presented on the head unit 114 of the MTE 110. The reason for this may be that the GPS spoofing attack 107 may have occurred because a driver of the MTE 110 used the GPS spoofing device 108 in an attempt to cause the HOS record 134 to store the spoofed location 107A instead of the actual location 192, thereby potentially allowing the MTE 110 to exceed one or more regulatory parameters (e.g., exceed the maximum hours that the MTE 110 is permitted to be operated in a 24 hour period, exceed an imposed speed limit for the MTE 110, exceed a maximum travel distance during a defined time period, or any other regulation and/or restriction imposed on the MTE 110). As such, in some embodiments, the LPWA device 120 may provide the GPS spoofing alert 185 to an administration account associated the MTE location data records 164, thereby informing an administrator that an instance of the GPS spoofing attack 107 was detected, and in some embodiments, without informing a driver of the MTE 110. In some embodiments, the GPS spoofing alert 185 may be configured to present an audiovisual output on the head unit 114 of the MTE 110, thereby informing a driver and/or user of the MTE 110 that an instance of the GPS spoofing attack 107 has been detected. It is understood that the examples provided are for illustration purposes only, and therefore should not be construed as limiting in any way.

In various embodiments, the spoofing detection service 174 can generate an instance of the correction command 188. The correction command 188 can include, or otherwise refer to the corrected route data 187 and/or any information provided by the GPS spoofing alert 185. In some embodiments, the correction command 188 can instruct or otherwise command the LPWA device 120 to update the correction log 128 by instantiating an instance of the GPS spoofing alert 185 to indicate that the GPS spoofing attack 107 occurred. In some embodiments, the correction command 188 can instruct the ELD 130 to store or otherwise record the GPS spoofing alert 185 within the HOS record 134. In some embodiments, the correction command 188 can instruct the ELD 130 that the instances of the GPS location data 136A-N during the times indicated by the spoofing time identifiers 186 correspond with the spoofed location 107A, and therefore are inaccurate because those instances of the GPS location data 136A-N were based on the GPS spoofing signals 109A-N that caused the GPS spoofing attack 107. In some embodiments, the correction command 188 may be provided to the MTE 110 separate from the GPS spoofing alert 185. For example, in some embodiments, the spoofing detection service 174 can generate a correction message 190 that includes the correction command 188. The GPS spoofing alert 185 can be included in the correction message 190, or may have previously been sent to the MTE 110. In some embodiments, the correction command 188 may include the GPS spoofing flag 184 that points to the MTE location data records 164 stored on the GMLC 162. By this, the ELD 130 may be informed that an instance of the GPS spoofing attack 107 has occurred without altering the HOS record 134, thereby preserving the inaccurate instances of the GPS location data 136A-N within the HOS record 134 as evidence of the GPS spoofing attack 107. In some embodiments, when the GPS spoofing alert 185 is sent to the MTE 110 without the correction command 188 and/or the correction message 190, the GPS spoofing alert 185 may be sent along the narrow band path provided by the LPWAN 152 (e.g., via the communication path 1), thereby enabling the LPWA device 120 and/or the ELD 130 to be informed of the GPS spoofing attack 107, thereby improving tracking of the GPS spoofing attack 107 even when the MTE 110 is outside of the transmission range of the RAN 154 provided by the communication path 2, as further discussed below. It is understood that the examples provided are for illustration purposes only, and therefore should not be construed as limiting in any way.

In various embodiments, the operating environment 100 can include the network 150 that can include, support, or otherwise communicate with the MTE 110 via the RAN 154 and/or the LPWAN 152. In some embodiments, at least a portion of the network 150, the LPWAN 152, and/or the RAN 154 can be associated with a communications service provider and/or a mobile network operator. In various embodiments, the network 150 can include an evolved packet core network, a core network, an IP-based network, a transport network, an optical transport network, a circuit switched network, a mobile Wide Area Network, a combination thereof, or the like. It is understood that the network 150 can communicate with one or more computing systems and/or devices that are external to the network 150 (e.g., one or more instances of the MTE 110) via one or more instances of the network access point 156 that can establish, provide, and maintain wireless and/or wired communication links.

In various embodiments, the LPWAN 152 can provide a larger transmission range and coverage area using the communication path 1 (i.e., using a narrow band path) than the use of communication path 2 via the RAN 154 (where the communication path 2 can provide a broad band path, such as 2G, 3G, 4G, LTE, etc.). In some embodiments, at least a portion of the LPWAN 152 can be supported, hosted, or otherwise included in the RAN 154. In some embodiments, an instance of the network access point 156 can be dedicated to the LPWAN 152, although this may not necessarily be the case. In some embodiments, an instance of the network access point 156 can be configured to support or otherwise be dedicated to the LPWAN 152 by facilitating and/or hosting the narrow band path provided by the communication path 1, which conforms to one or more LPWA radio protocols discussed above. Therefore, in some embodiments, an instance of the network access point 156 that supports the LPWAN 152 can be configured as a base transceiver station or any other low-power wide area access point that conforms to, or otherwise enables and supports, the narrow band path provided by the communication path 1. In various embodiments, the LPWAN 152 can provide a larger coverage area through the use of the narrow band path provided by the communication path 1. Therefore, when an instance of the network access point 156 is used to support the LPWAN 152 and the communication path 1, communications to and/or from the MTE 110 can be provided at a greater distance than communications provided using the communication path 2, which corresponds with broad band wide area wireless protocols (e.g., 2G, 3G, 4G, LTE, etc.).

In some embodiments, an instance of the network access point 156 can be configured to provide wireless communication via the communication path 2, where the communication path 2 does not conform to LPWA protocols discussed above, but rather may provide cellular service via another wide area radio technology. For example, the network access point 156 that supports the communication path 2 of the RAN 154 can include, but should not be limited to, one or more of a base transceiver station, a wireless router, a femtocell, an Node B, an eNodeB, a gNodeB (i.e., an access point that incorporates New Radio access technology, such as LTE Advanced, and other 5G technology), a multi-standard metro cell node, an optical network terminal, and/or other network nodes or combinations thereof that are capable of providing communication to and/or from the RAN 154 to the MTE 110 via the communication path 2.

As illustrated in FIG. 1, the MME 160, the GMLC 162, and/or the E-SMLC 158 are hosted or otherwise supported by the network 150, although this may not necessarily be the case. In some embodiments, one or more instances of the MME 160, the GMLC 162, and/or the E-SMLC 158 may be located, hosted, or otherwise supported by the RAN 154 and/or the LPWAN 152. In some embodiments, the network 150 can include and support one or more of an evolved universal mobile telecommunications system ("UMTS"), a terrestrial radio access ("E-UTRAN"), a serving/PDN gateway ("S/PGW"), a home subscriber server ("HSS"), an access and mobility function ("AMF"), a session management function-user plane function ("SMF-UPF"), unified data management ("UDM"), a vehicle-to-everything ("V2X") application server, an application function ("AF"), an enhanced mobile broadband system ("eMBBS"), a mobile edge computing ("MEC") unit, a combination thereof, and/or any other systems, devices, and/or functions that may be included in 2G, 3G, 4G, 5G, or later communication architecture. It should be understood that the examples provided are for illustration purposes only, and therefore should not be construed as limiting in any way.

FIG. 1 illustrates the operating environment 100 having one or more instance of the GPS 102, the GPS satellites 104A-N, the authentic GPS signals 106A-N, the GPS spoofing attack 107, the spoofed location 107A, the GPS spoofing device 108, the GPS spoofing signals 109A-N, the MTE 110, the processor 111, the memory 112, the MTE identifier 113, the head unit 114, the active driving mode 115A, the off-duty driving mode 115B, the TCU 116, the LPWA device 120, the LPWAN transceiver 122, the local device sensor 123, the sampling rate 124, the independent location data 125A-N, the mobile terminal location response data 126, the local device sensor measurements 127, the ELD 130, the GPS receiver unit 131, the sampling rate 132, the HOS record 134, the GPS location data 136A-N, the GPS measurements 138, the GPS-based measurement messages 140, the mobile terminal location request 142, the quality of service parameters 144, the mobile terminal location response 146, the communication path 1, the communication path 2, the network 150, the LPWAN 152, the RAN 154, the network access point 156, the E-SMLC 158, the GMLC 162, the MTE location data records 164, the network server 170, the processor 171, the memory 172, the measurement reporting clients 173, the GPS location measurement set 176, the measurement period 177, the non-GPS-based location measurement set 178, the measurement period 179, the spoofing detection service 174, the ELD estimates 180, the LPWA device estimates 182, the GPS spoofing alert 185, the GPS spoofing flag 184, the spoofing time identifier 186, the corrected route data 187, the correction command 188, the LOCP 189, the correction message 190, the actual location 192, and the deviation distance 194. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Figure 2:
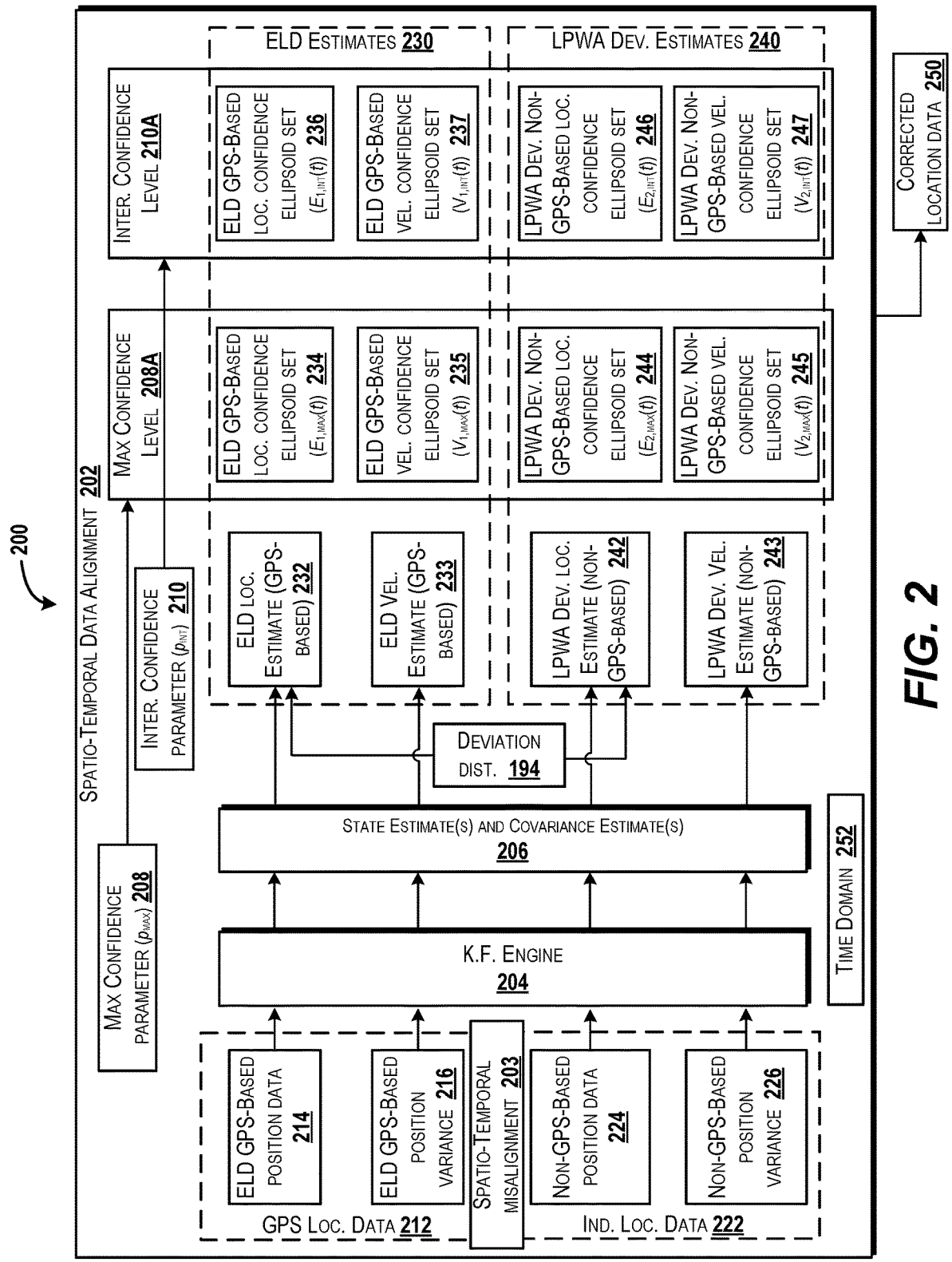
FIG. 2 is a block diagram illustrating aspects of providing spatio-temporal data alignment, according to various embodiments disclosed herein.

Turning now to FIG. 2 with continued reference to FIG. 1, a block diagram 200 illustrating aspects of providing the spatio-temporal data alignment 202 will be described, according to an illustrative embodiment. It is understood that one or more aspects of the spatio-temporal data alignment 202 can be provided, performed, implemented, or otherwise applied by one or more elements discussed above with respect to FIG. 1, such as but not limited to, the spoofing detection service 174. In some embodiments, the spoofing detection service 174 can provide one or more engines that implement, provide, or otherwise apply a Kalman filter and/or an enhanced Kalman filter, such as a Kalman filter engine 204. The Kalman filter engine 204 can be configured to generate or otherwise create state estimates and covariance estimates 206 based on input provided, such as GPS location data 212 and independent location data 222 discussed below. It is understood that the spatio-temporal data alignment 202 that provides time-alignment (e.g., via application of the Kalman filter engine 204) can enable detection of the GPS spoofing attack 107 despite the LPWA device 120 obtaining and reporting information about the location of the LPWA device 120 to the GMLC 162 less frequently than the rate at which the ELD 130 determines and reports the location of the ELD 130 to the GMLC 162.

For example, in some embodiments, the spoofing detection service 174 can (a)periodically monitor the MTE location data records 164 for new, incoming location data from GPS-based and non-GPS-based sources, such as the GPS location data 136A-N and the independent location data 125A-N, respectively. In various embodiments, the GPS location data 136A-N and the independent location data 125A-N are received at periodic intervals, such as according to the measurement period ("$T_1$") 177 and the measurement period ("$T_2$") 179, respectively. As discussed above with respect to FIG. 1, $T_2$ 179 is longer (i.e., greater) than $T_1$ 177 because the sampling rate for the LPWA device 120 (i.e., the sampling rate 124) is less than the sampling rate for the ELD 130 (i.e., the sampling rate 132), thereby resulting in the GPS location data 136A-N being reported more frequently to the GMLC 162 than the independent location data 125A-N. In some embodiments, MTE location data records 164 can store the GPS location data 136A-N in the GPS location measurement set 176 and can store the independent location data 125A-N in the non-GPS-based location measurement set 178.

As illustrated in FIG. 2, in various embodiments, at a location spoofing detection decision time instance (e.g., after every instance of the $T_2$ 179), the spoofing detection service 174 may obtain GPS location data 212 and independent location data 222. It is understood that, in FIG. 2, the GPS location data 212 can correspond with an instance of GPS-based location data, such as from among the GPS location data 136A-N shown in FIG. 1. Similarly, in FIG. 2, the independent location data 222 can correspond with an instance of non-GPS-based location data, such as from among the independent location data 125A-N shown in FIG. 1. The GPS location data 212 can include an instance of ELD GPS-based position data 214 (e.g., a time stamp of when measurements were obtained by the GPS receiver unit 131, a latitude coordinate, a longitude coordinate, and an altitude coordinate that are obtained based on GPS signals). In various embodiments, the GPS location data 212 can also include values for an ELD GPS-based position variance 216 (e.g., horizontal uncertainty values, such as uncertainty for latitude and longitude, and a vertical uncertainty value, such as uncertainty for altitude, for the ELD 130 obtained based on GPS signals). The ELD GPS-based position data 214 and the ELD GPS-based position variance 216 can be provided by the GPS measurements 138 that are included in the GPS location data 136A-N. The GPS location data 212 may be input or otherwise provided to the Kalman filter engine 204.

In various embodiments, the independent location data 222 is also provided to the Kalman filter engine 204. The independent location data 222 can include non-GPS-based position data 224 (e.g., a time stamp of when measurements were obtained by the GPS receiver unit 131, a latitude coordinate, a longitude coordinate, and an altitude coordinate that are obtained through non-GPS-based mechanisms, such as mobile terminal location response data 126 from the LPWAN 152 and the local device sensor measurements 127 from the local device sensor 123) and values for a non-GPS-based position variance 226 (e.g., horizontal uncertainty values, such as uncertainty for latitude and longitude, and a vertical uncertainty value, such as uncertainty for altitude, for the LPWA device 120 obtained through non-GPS-based mechanisms, such as mobile terminal location response data 126 from the LPWAN 152 and the local device sensor measurements 127 from the local device sensor 123). The non-GPS-based position data 224 and the non-GPS-based position variance 226 can be provided by the mobile terminal location response data 126 from the LPWAN 152 and the local device sensor measurements 127 from the local device sensor 123, which are included in the independent location data 125A-N.

In various embodiments, the independent location data 222 and the GPS location data 212 have spatio-temporal misalignment 203, that is the ELD GPS-based position data 214 does not match, and is not aligned, with the non-GPS-based position data 224, and the independent location data 222 is time-misaligned relative to the GPS location data 212. Therefore, the Kalman filter engine 204 can provide alignment in a time domain 252, and can generate the state estimates and covariance estimates 206 to enable comparison of the position data according to various confidence levels, as discussed below.

The spatio-temporal data alignment 202 implements one or more confidence parameters that each define a confidence level for application to a confidence ellipsoid that is stored and represented by instances of a confidence ellipsoid set for a particular estimate at time $t_i$. Examples of confidence parameters can include a specified maximum confidence parameter, such as a maximum confidence parameter 208, and another specified confidence parameter that is less than the maximum, such as an intermediate confidence parameter 210, where the maximum confidence parameter 208 provides or otherwise defines a maximum confidence level 208A (e.g., a 99.9% amount of statistical confidence level), and the intermediate confidence parameter 210 provides or otherwise defines an intermediate confidence level 210A (e.g., an 80% amount of statistical confidence level). In some embodiments, the intermediate confidence level can be considered a "high," but not maximum confidence level. The confidence parameters (e.g., the maximum confidence parameter 208 and the intermediate confidence parameter 210) can be utilized by the Kalman filter engine 204 to generate covariance estimates for a corresponding estimate, which in some embodiments, may be configured as a separate confidence ellipsoid set for each confidence level (e.g., for each of the maximum confidence level 208A and the intermediate confidence level 210A). Stated generally, the spatio-temporal data alignment 202 can generate, from data provided by a particular device, device estimates that include a location estimate, a velocity estimate, a plurality of confidence ellipsoid sets for the location estimate (e.g., one confidence ellipsoid set at each confidence level), and a plurality of confidence ellipsoid sets for the velocity estimate (e.g., one confidence ellipsoid set at each confidence level). Stated specifically, as illustrated in FIG. 2, for a particular time instance at which GPS spoofing detection is to be performed (e.g., at time $t_i$), the Kalman filter engine 204 can apply a Kalman filter and/or an enhanced Kalman filter to the GPS location data 212 and the independent location data 222 so as to generate ELD estimates 230 and LPWA device estimates 240, where the ELD estimates 230 are GPS-based and the LPWA device estimates 240 are not GPS-based. It is understood that the ELD estimates 230 and the LPWA device estimates 240 shown in FIG. 2 correspond with the ELD estimates 180 and the LPWA device estimates 182 shown in FIG. 1, respectively.

The ELD estimates 230 (which correspond to the ELD 130) generated by the Kalman filter engine 204 can include an ELD location estimate 232 (that is GPS-based) and a location confidence ellipsoid set for each confidence level (i.e., for each confidence parameter), such as an ELD GPS-based location confidence ellipsoid set ("$E_{1,MAX}(t)$") 234 for the maximum confidence level 208A and an ELD GPS-based location confidence ellipsoid set ("$E_{1,INT}(t)$") 236 for the intermediate confidence level 210A. In some embodiments, the $E_{1,MAX}(t)$") 234 may be referred to as a first GPS-based location confidence ellipsoid set, and the $E_{1,INT}(t)$ 236 may be referred to as a second GPS-based location confidence ellipsoid set. The ELD location estimate 232 can include or otherwise be based on information from the ELD GPS-based position data 214, as discussed above. As such, the ELD location estimate 232 can include a latitude, longitude, altitude, and time stamp based on the information provided by the ELD 130 of the MTE 110. The ELD estimates 230 can also include an ELD velocity estimate 233 (that is GPS-based) and a velocity confidence ellipsoid set for each confidence level, such as ELD GPS-based velocity confidence ellipsoid set ("$V_{1,MAX}(t)$") 235 for the maximum confidence level 208A and an ELD GPS-based velocity confidence ellipsoid set ("$V_{1,INT}(t)$") 237 for the intermediate confidence level 210A. In some embodiments, the $V_{1,MAX}(t)$ 235 may be referred to as a first GPS-based velocity confidence ellipsoid set, and the $V_{1,INT}(t)$ 237 may be referred to as a second GPS-based velocity confidence ellipsoid set.

The LPWA device estimates 240 (which correspond to the LPWA device 120) generated by the Kalman filter engine 204 can include an LPWA device location estimate 242 (that is not GPS-based) and a location confidence ellipsoid set for each confidence level (i.e., for each confidence parameter), such as an LPWA device non-GPS-based location confidence ellipsoid set ("$E_{2,MAX}(t)$") 244 for the maximum confidence level 208A and an LPWA device non-GPS-based location confidence ellipsoid set ("$E_{2,INT}(t)$") 246 for the intermediate confidence level 210A. In some embodiments, the $E_{2,MAX}(t)$ 244 may be referred to as a first non-GPS-based location confidence ellipsoid set, and the $E_{2,INT}(t)$ 246 may be referred to as a second non-GPS-based location confidence ellipsoid set. The LPWA device location estimate 242 can include or otherwise be based on information from the non-GPS-based position data 224 from the LPWA device 120, as discussed above. As such, the LPWA device location estimate 242 can include a latitude, longitude, altitude, and time stamp (as obtained via the LPWAN 152 from the mobile terminal location response data 126) based on the information provided by the LPWA device 120 of the MTE 110. The LPWA device estimates 240 can also include an LPWA device velocity estimate 243 (that is not GPS-based) and a velocity confidence ellipsoid set for each confidence level, such as LPWA non-GPS-based velocity confidence ellipsoid set ("$V_{2,MAX}(t)$") 245 for the maximum confidence level 208A and an LPWA device non-GPS-based velocity confidence ellipsoid set ("$V_{2,INT}(t)$") 247 for the intermediate confidence level 210A. In some embodiments, the $V_{2,MAX}(t)$ 245 may be referred to as a first non-GPS-based velocity confidence ellipsoid set, and the $V_{2,INT}(t)$ 247 may be referred to as a second non-GP S-based velocity confidence ellipsoid set.

In various embodiments, the spatio-temporal data alignment 202 can compare the LPWA device estimates 240 to the ELD estimates 230 in order to determine and detect whether a deviation distance 194 exists between the estimated location of the LPWA device 120 and the ELD 130. In some embodiments, an instance of the deviation distance 194 can be determined by analyzing and comparing, between the ELD 130 and the LPWA device 120, the various confidence ellipsoid sets for location and velocity. Specifically, determination that a GPS spoofing attack has occurred can be based on verifying that confidence ellipsoid sets for location and velocity (at various confidence levels) do not intersect. A brief discussion will be provided, followed by further discussion with respect to FIG. 4A. The spoofing detection service 174 can compare and determine whether the various confidence sets for each device intersect each other at particular confidence levels. Specifically, if the velocity confidence sets at a particular confidence level do not intersect or the location confidence sets at a particular confidence level do not intersect, then such non-intersection can indicate the occurrence of the GPS spoofing attack 107. The non-intersection between GPS-based and non-GPS-based confidence ellipsoid sets for location and/or velocity (i.e., for a particular confidence level, ELD GPS-based location confidence ellipsoid sets not intersecting LPWA device non-GPS-based location confidence ellipsoid sets, and/or ELD GPS-based velocity confidence ellipsoid sets not intersecting LPWA device non-GPS-based velocity confidence ellipsoid sets) indicates that the true location estimate determined from the LPWA device (e.g., the LPWA device location estimate 242 that is not GPS-based determined from the independent location data 222 provided by the LPWA device 120, which reveals the actual location 192) deviates (in some instances deviating significantly) from the spoofed location estimate determined from the ELD 130 (e.g., the ELD location estimate 232 determined from the GPS location data 212 provided by the ELD 130). For example, in some embodiments, the spoofing detection service 174 may determine that an instance of the GPS spoofing attack 107 has occurred in response to determining that the $E_{1,INT}(t)$ 236 is not intersecting the $E_{2,INT}(t)$ 246 and/or that the $V_{1,INT}(t)$ 237 is not intersecting the $V_{2,INT}(t)$ 247. Stated differently, when the $E_{1,INT}(t)$ 236 does not intersect the $E_{2,INT}(t)$ 246 and/or the $V_{1,INT}(t)$ 237 does not intersect the $V_{2,INT}(t)$ 247, this can mean that a GPS spoofing attack has occurred, and therefore the information provided by the LPWA device 120 more accurately represents the actual location 192 of the MTE 110, while the information from the ELD 130 appears to represent the spoofed location 107A. This is because, for the intermediate confidence level 210A, the independent location data 125A-N (which was used to produce the LPWA device estimates 240 that include the ellipsoid confidence sets, that is the $E_{2,INT}(t)$ 246 and the $V_{2,INT}(t)$ 247) and/or the LPWA device location estimate 242 more accurately coincides with, or otherwise represents, the actual location 192 of the MTE 110, and therefore the actual location 192 deviates (in some instances deviating significantly) from the ELD location estimate 232 derived from the GPS location data 136A-N. As such, the ELD location estimate 232 coincides with, or otherwise represents, the spoofed location 107A because the GPS location data 136A-N (which was used to produce the ELD estimates 230 that include the ellipsoid confidence sets, that is the $E_{1,INT}(t)$ 236 and the $V_{1,INT}(t)$ 237) was impacted by the GPS spoofing device 108 generating the GPS spoofing attack 107.

In some embodiments, if either the $E_{1,INT}(t)$ 236 does not intersect the $E_{2,INT}(t)$ 246 or the $V_{1,INT}(t)$ 237 does not intersect the $V_{2,INT}(t)$ 247, then the spoofing detection service 174 may seek further verification and/or detection as to whether an instance of the GPS spoofing attack 107 has occurred. The spoofing detection service 174 can further analyze estimations for the ELD 130 and the LPWA device 120 using a higher confidence level, such as by analyzing the confidence ellipsoid sets at the maximum confidence level 208A. For example, in some embodiments, if the $E_{1,MAX}(t)$ 234 does not intersect the $E_{2,MAX}(t)$ 244 or the $V_{1,MAX}(t)$ 235 does not intersect the $V_{2,MAX}(t)$ 245, then the spoofing detection service 174 indicates that an instance of the GPS spoofing attack 107 occurred because the LPWA device location estimate 242 more accurately coincides with, or otherwise represents, the actual location 192 of the MTE 110, while the GPS location data 136A-N (which was used to produce the ELD estimates 230 that include the ellipsoid confidence sets, that is the $E_{1,MAX}(t)$ 234 and the $V_{1,MAX}(t)$ 235) and/or the ELD location estimate 232 coincides with, or otherwise represents, the spoofed location 107A. In some embodiments, if the $E_{1,MAX}(t)$ 234 intersects the $E_{2,MAX}(t)$ 244 and the $V_{1,MAX}(t)$ 235 intersects the $V_{2,MAX}(t)$ 245, then the spoofing detection service 174 can indicate that an instance of the GPS spoofing attack 107 has not occurred, and therefore can wait for the next time instance that is scheduled to provide GPS spoofing detection via spatio-temporal data alignment.

In some embodiments, when the spoofing detection service 174 determines that the actual location 192 of the MTE 110 should coincide with the LPWA device 120 instead of the spoofed location 107A provided by the ELD 130, the spoofing detection service 174 may set or otherwise configure the GPS spoofing flag 184 to indicate that an instance of the GPS spoofing attack 107 has occurred. In some embodiments, in response to the spoofing detection service 174 determining that an instance of the GPS spoofing attack 107 has, or may have, occurred, the spoofing detection service 174 may perform further verification and/or confirmation of the GPS spoofing attack 107 before informing, recording, or otherwise alerting other devices of the GPS spoofing attack 107. For example, the spoofing detection service 174 may be configured such that even though an instance of the GPS spoofing attack 107 is detected to have occurred, client privacy parameters may be in place to allow or otherwise permit a certain amount of location deviation before the GPS spoofing attack 107 is be recorded or otherwise confirmed. For instance, in some embodiments, the LOCP 189 can provide or otherwise define an allowable deviation distance that the MTE 110 is permitted to travel when the MTE 110 has activated, or is otherwise operating in, the off-duty driving mode 115B. Therefore, in some embodiments, even though the actual location 192 of the MTE 110 is not directly matching or otherwise agreeing with the spoofed location 107A, the deviation distance 194 between the ELD location estimate 232 and the LPWA device location estimate 242 (which can, in some embodiments, correspond to the spoofed location 107A and the actual location 192, respectively) may be permitted to vary up to the allowable deviation distance indicated by the LOCP 189 (e.g., up to 10 miles, or another distance).

In some embodiments, if the spoofing detection service 174 determines that an instance of the GPS spoofing attack 107 has occurred, then the spoofing detection service 174 may generate an instance of corrected location data 250. The corrected location data 250 can represent one or more instances of information provided by the LPWA device 120 for a particular instance in time during the GPS spoofing attack 107. For example, the corrected location data 250 can include the LPWA device estimates 240, such as the LPWA device location estimate 242 and the LPWA device velocity estimate 243. By this, the latitude, longitude, altitude, time stamps, and any other information provided by the LPWA device estimates 240 can be considered to represent the actual location 192 for a particular time instance, such as indicated by an instance of the spoofing time identifier 186. In some embodiments, an instance of the corrected location data 250 may correspond to a single instance in time in which the GPS spoofing attack 107, occurred and therefore multiple instances of the corrected location data 250 may be included in the corrected route data 187, thereby indicating or otherwise providing a record of the actual route traveled by the MTE 110 while the GPS spoofing attack 107 was taking place. It is understood that the examples provided are for illustration purposes only, and therefore should not be construed as limiting in any way.

Turning now to FIGS. 3A-B, 4A, and 4B with continued references to FIGS. 1 and 2, aspects of a method 300, a method 400, and a method 450 will be described in detail, according to various illustrative embodiments. It should be understood that each of the operations of the one or more methods disclosed herein (e.g., the method 300, the method 400, and/or the method 450 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that any use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, a network platform, edge devices, vehicles, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the MTE 110, the ELD 130, the LPWA device 120, the network access point 156, the E-SMLC 158, the MME 160, the GMLC 162, the network 150, the LPWAN 152, the RAN 154, and/or the network server 170, to perform one or more operations and/or causing one or more instances of a processor to direct other components of a computing system or device, to perform one or more of the operations.

For purposes of illustrating and describing the concepts of the present disclosure, one or more of the operations of methods disclosed herein are described as being performed by one or more instance of the network server 170 via execution of one or more computer-readable instructions configured so as to instruct and transform a processor, such as via execution of the spoofing detection service 174 that can configure the processor 171. In some embodiments, one or more operations may be performed by one or more of the LPWA device 120 and/or the ELD 130. It should be understood that additional and/or alternative devices and/or network infrastructure devices can, in some embodiments, provide the functionality described herein via execution of one or more routines, applications, and/or other software including, but not limited to, the spoofing detection service 174, the E-SMLC 158, the GMLC 162, the MME 160, and/or any other computer executable instructions that can configure a device discussed herein, such as but not limited to one or more of the network server 170, the MTE 110, the ELD 130, and/or the LPWA device 120. Thus, the illustrated embodiments are illustrative, and should not be viewed as being limiting in any way.

In various embodiments, one or more instances of a computer system associated with the spoofing detection service 174 may execute so as to cause one or more processor (e.g., an instance of the processor 171 and/or the processor 111) to perform at least a portion of one or more operations discussed herein. In various embodiments, execution of the GPS spoofing alert 185 and/or the correction command 188 can cause one or more instances of the MTE 110 (and/or any components therein, such as the LPWA device 120 and/or the ELD 130) to perform one or more operations discussed herein. It should be understood that the examples provided are for illustration purposes only, and therefore should not be construed as limiting in any way. The method 300, the method 400, and the method 450 will be described with reference to one or more of the FIGS. 1 and 2.

Figure 3A:
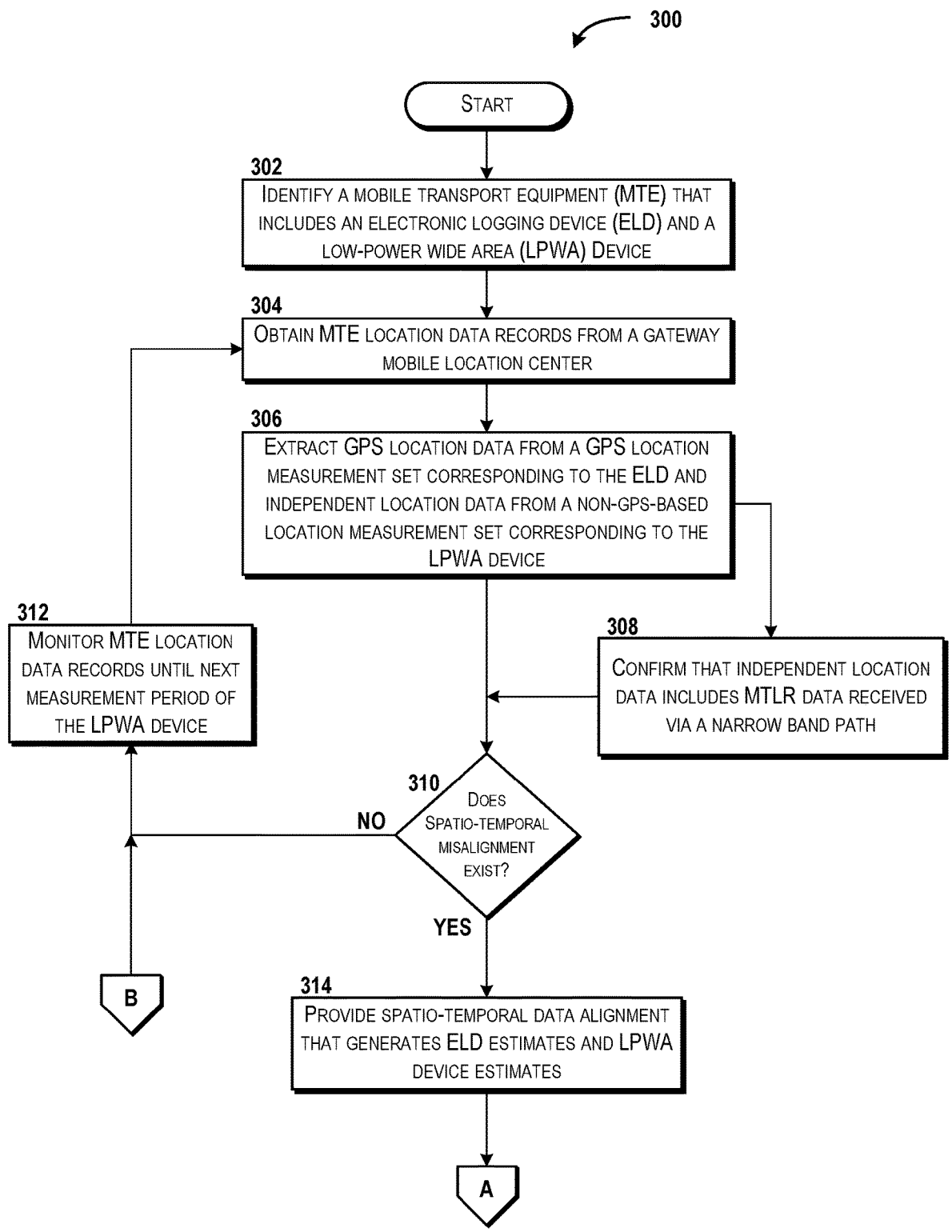
FIGS. 3A and 3B provide a flow diagram illustrating aspects of a method for global positioning system spoofing countermeasures, according to an illustrative embodiment.
Figure 3B:
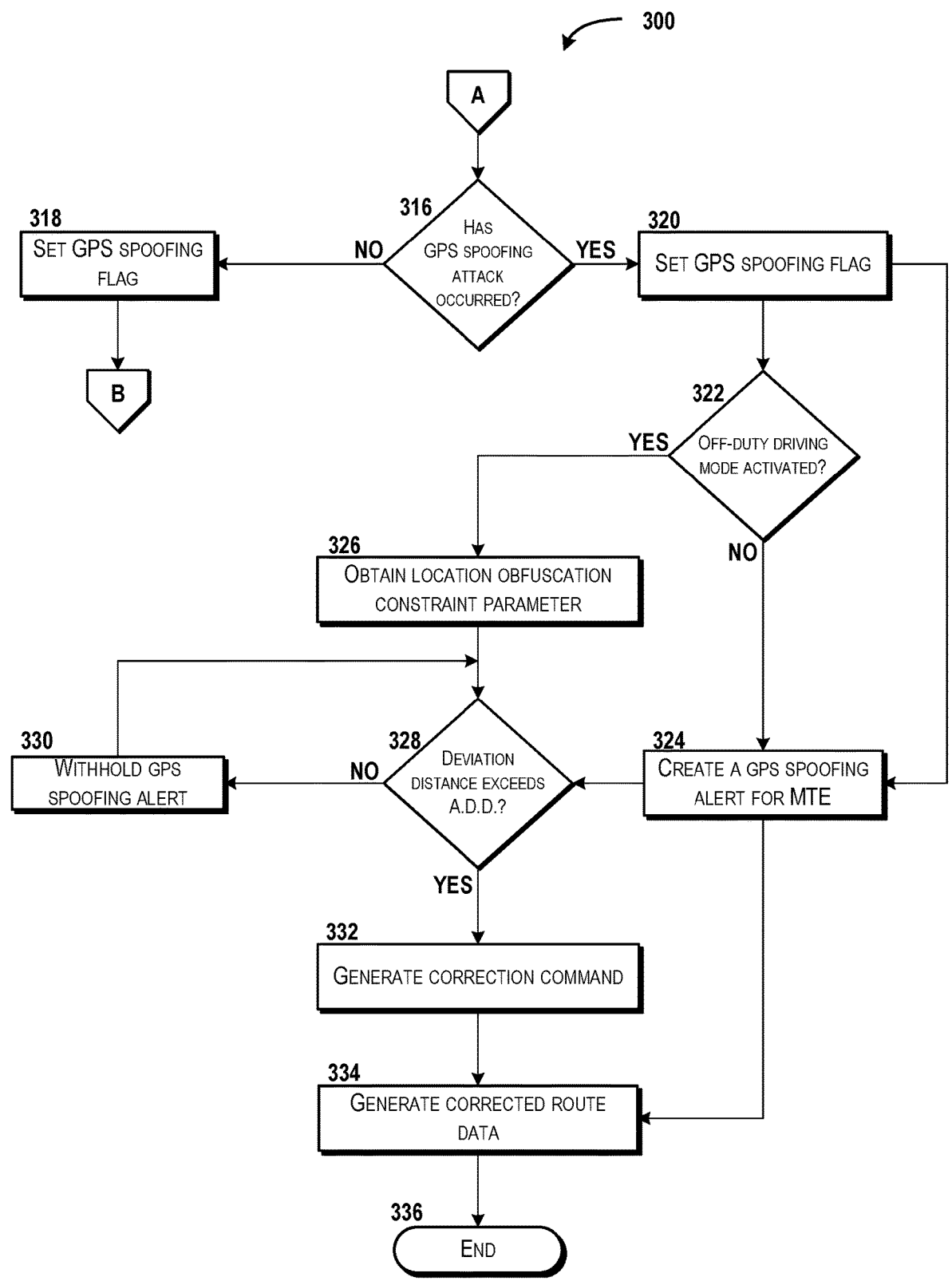

Turning now to FIGS. 3A and 3B, the method 300 for global positioning system spoofing countermeasures is disclosed, according to an illustrative embodiment. In some embodiments, one or more operations of the method 300 can be implemented by the spoofing detection service 174 executing on one or more instances of the network server 170. The method 300 can begin and proceed to operation 302, where the spoofing detection service 174 can identify a mobile transportation equipment comprising an electronic logging device and a low-power wide area device, such as the MTE 110 that comprises the LPWA device 120 and the ELD 130. In some embodiments, the ELD can obtain GPS location data (e.g., instances of the GPS location data 136A-N) via a GPS receiver unit (e.g., the GPS receiver unit 131) that receives GPS signals, such as the authentic GPS signals 106A-N and/or the GPS spoofing signals 109A-N. In some embodiments, the LPWA device 120 can obtain or otherwise generate instances of independent location data (e.g., any of the independent location data 125A-N) via a narrow band path of a low-power wide area network, such as via the communication path 1 that communicatively couples the LPWA device 120 to the LPWAN 152 using LPWA radio protocols. In various embodiments, the ELD 130 can maintain an hours of service record (e.g., the HOS record 134) that tracks movement of a mobile transportation equipment (e.g., the MTE 110) based on GPS location data (e.g., the GPS location data 136A-N that is obtained based on receiving GPS signals).

From operation 302, the method 300 can proceed to operation 304, where the spoofing detection service 174 can obtain the MTE location data record 164 that corresponds with the MTE 110, where the MTE location data record 164 can be obtained from the GMLC 162.

From operation 304, the method 300 can proceed to operation 306, where the spoofing detection service 174 can extract the GPS location data 136A-N from the GPS location measurement set 176 corresponding to the ELD 130. In various embodiments, the spoofing detection service 174 also can extract the independent location data 125A-N from the non-GPS-based location measurement set 178 corresponding to the LPWA device 120.

In some embodiments, from operation 306, the method 300 may proceed to operation 308, where the spoofing detection service 174 can confirm that the independent location data 125A-N includes an instance of the mobile terminal location response data 126, which is received via a narrow band path from the LPWAN 152. In some embodiments, the independent location data 125A-N includes an instance of the mobile terminal location response data 126 that is joined to the local device sensor measurements 127.

In some embodiments, the method 300 may proceed from operation 306 and/or operation 308 to operation 310, where the spoofing detection service 174 can determine whether a spatio-temporal misalignment (e.g., the spatio-temporal misalignment 203 discussed with respect to FIG. 2) exists between the independent location data 125A-N and the GPS location data 136A-N for the MTE 110.

In some embodiments, if the spoofing detection service 174 determines that a spatio-temporal misalignment does not exist, then the method 300 may proceed along the NO path from operation 310 to operation 312. At operation 312, the spoofing detection service 174 can monitor the MTE location data records 164 for incoming instances of the independent location data 125A-N, which may be provided to the GMLC 162 at the measurement period (e.g., the measurement period 179 corresponding to the non-GPS-based location measurement set 178). From operation 312, the method 300 may proceed to operation 304, where one or more aspects of the method 300 may be performed at the next time instance.

Returning to operation 310, in some embodiments, the spoofing detection service 174 may determine that a spatio-temporal misalignment exists between the independent location data 125A-N and the GPS location data 136A-N for the MTE 110. If a spatio-temporal misalignment is detected, the method 300 may proceed along the YES path from operation 310 to operation 314.

At operation 314, the spoofing detection service 174 can provide spatio-temporal data alignment 202 that generates an instance of the ELD estimates 180 and an instance of the LPWA device estimates 182. The ELD estimates 180 and the LPWA device estimates 182 may be generated based on application of a filter (e.g., a Kalman filter and/or an enhanced Kalman filter) to the GPS location data 136A-N and the independent location data 125A-N, respectively. The method 300 may proceed to operation 316, which is illustrated in FIG. 3B.

At operation 316, the method 300 can include determining whether an instance of the GPS spoofing attack 107 has occurred. In various embodiments, the spoofing detection service 174 can determine whether the GPS spoofing attack 107 has occurred based on the ELD estimates 180 and the LPWA device estimates 182. Further discussion of the spatio-temporal misalignment 203 and detection of the GPS spoofing attack 107 is provided below with respect to FIG. 4A. In some embodiments, the spoofing detection service 174 may determine that an instance of the GPS spoofing attack 107 has not occurred, and therefore the method 300 may proceed from operation 316 to operation 318, where the spoofing detection service 174 can set an instance of the GPS spoofing flag 184 to indicate that the GPS spoofing attack 107 has not occurred. The GPS spoofing flag 184 can be recorded with the MTE location data record 164 for the time instance under analysis. In some embodiments, the method 300 may proceed from operation 318 to operation 312 discussed above.

Returning to operation 316, in some embodiments, the spoofing detection service 174 may determine that an instance of the GPS spoofing attack 107 has occurred. In various embodiments, the spoofing detection service 174 can determine that the GPS spoofing attack 174 has occurred in response to determining that the LPWA device estimates 240 coincide with, or otherwise may accurately represent, the actual location 192 of the MTE 110 instead of the ELD estimates 230 which were derived or otherwise determined from GPS-based information provided by the ELD 130 (e.g., the GPS location data 212). Therefore, in various embodiments, in response to the spoofing detection service 174 determining that the GPS spoofing attack 107 has, and/or may have, occurred, then the method 300 may proceed along the YES path to operation 320, where the spoofing detection service 174 can set or otherwise configure the GPS spoofing flag 184 to indicate that the GPS spoofing attack 107 has occurred.

In some embodiments, the method 300 may proceed from operation 320 to operation 324, which will be discussed below in further detail. In some embodiments, from operation 320, the method 300 may proceed to operation 322, where the spoofing detection service 174 can set an instance of the GPS spoofing flag 184 to indicate that an instance of the GPS spoofing attack 107 has occurred. In some embodiments, the method 300 may proceed from operation 320 to operation 324, which will be discussed below. In some embodiments, the method 300 may proceed from operation 320 to operation 322.

At operation 322, the spoofing detection service 174 can detect whether the off-duty driving mode 115B was activated on the MTE 110 during the time instance corresponding to the GPS spoofing attack 107. The off-duty driving mode 115B may be indicated in the MTE location data record 164. In some embodiments, if the spoofing detection service 174 detects that an off-duty driving mode was not activated on the MTE 110 (e.g., by detecting that the active driving mode 115A was activated) then the method 300 may proceed along the NO path to operation 324, where the spoofing detection service 174 can create an instance of the GPS spoofing alert 185 for the MTE 110 so as to indicate that the GPS spoofing attack 107 has occurred. In some embodiments, the method 300 may proceed from operation 324 to operation 334 and/or operation 328. For clarity purposes, a discussion of operation 328 will be provided first, followed by a discussion of the operation 334.

Returning to operation 322, if the spoofing detection service 174 determines that the off-duty driving mode 115B was activated, then the method 300 may proceed along the YES path to operation 326, where the spoofing detection service 174 can obtain an instance of the LOCP 189 corresponding to the MTE 110. In various embodiments, the LOCP 189 can indicate an allowable deviation distance that the MTE 110 is permitted to travel from the actual location 192 before an instance of the GPS spoofing alert 185 is recorded, presented, and/or provided to the MTE 110, the GMLC 162, and/or another device.

From operation 326, the method 300 may proceed to operation 328, where the spoofing detection service 174 can determine whether the deviation distance 194 exceeds the allowable deviation distance as defined by the LOCP 189. If the deviation distance 194 does not exceed the LOCP 189, then the method 300 may proceed along the NO path from operation 328 to operation 330, where the spoofing detection service 174 may withhold an instance of the GPS spoofing alert 185 from being provided to the ELD 130 of the MTE 110 and/or to the GMLC 162 until the deviation distance 194 exceeds the allowable deviation distance defined by the LOCP 189. From operation 330, the method 300 can return to operation 328 for additional monitoring the deviation distance 194.

Returning to operation 328, in response to determining that the deviation distance exceeds the allowable deviation distance provided by the LOCP 189, the method 300 may proceed along the YES path from operation 328 to operation 332, where the spoofing detection service can generate an hours of service correction command, such as an instance of the correction command 188. In various embodiments, the correction command 188 can instruct the ELD 130 to update an hours of service log, such as the HOS record 134, with corrected route data and spoofing time identifiers corresponding to the spoofing attack, such as the corrected route data 187 and the spoofing time identifiers 186 corresponding to the GPS spoofing attack 107.

From operation 332, the method 300 may proceed to operation 334, where the spoofing detection service 174 can generate an instance of the corrected route data 187 that represents the actual location 192 of the MTE 110 during the GPS spoofing attack 107. In some embodiments, generation of the corrected route data 187 may occur in response to determining that the deviation distance 194 exceeds the allowable deviation distance provided by the LOCP 189.

From operation 334, the method 300 may proceed to operation 336, where the method 300 may end. It should be understood that the examples provided are for illustration purposes only, and therefore should not be construed as limiting in any way.

Figure 4A:
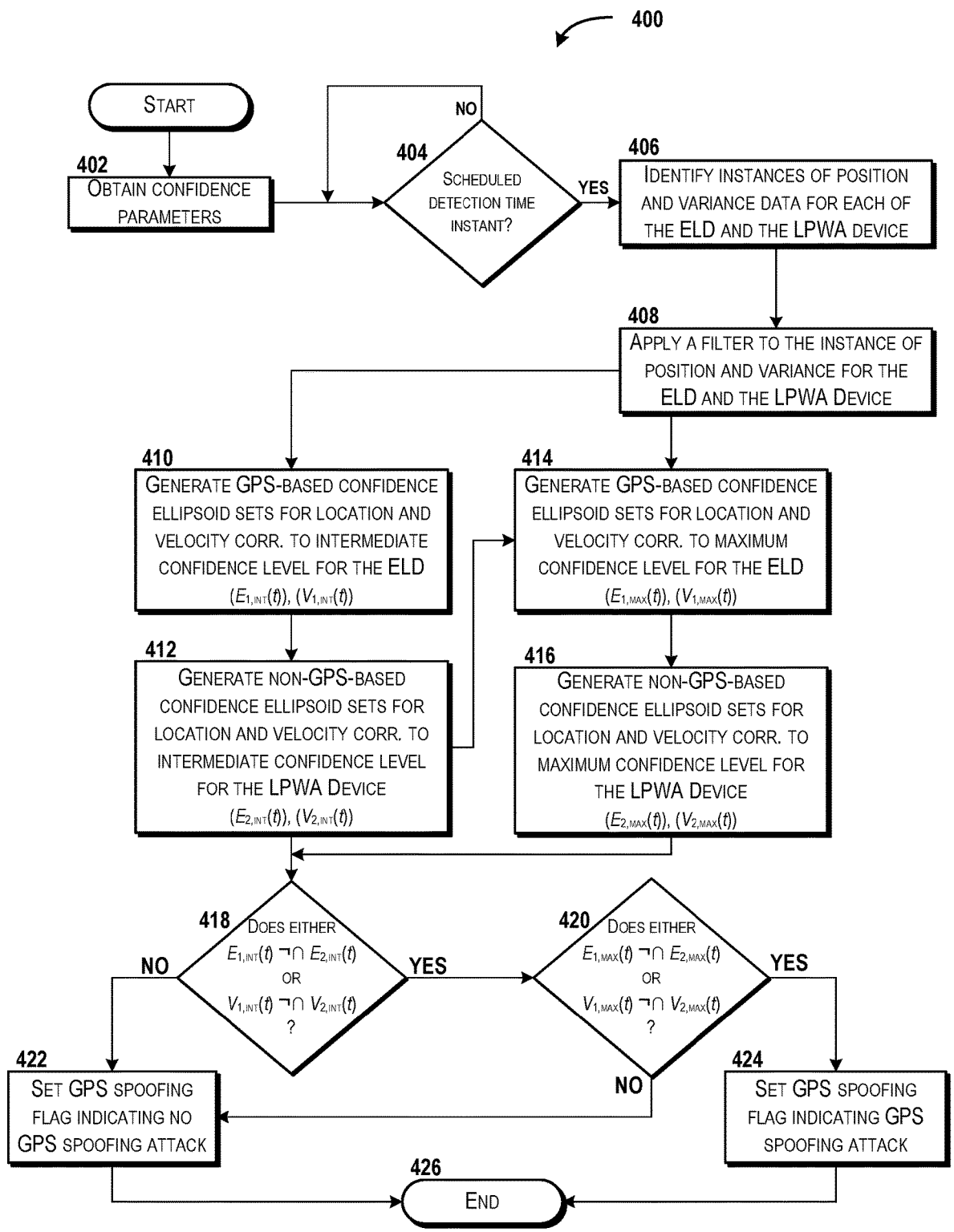
FIG. 4A is a flow diagram illustrating aspects of a method for providing spatio-temporal data alignment, according to an illustrative embodiment.

Turning now to FIG. 4A, the method 400 for providing spatio-temporal data alignment is disclosed, according to an illustrative embodiment is disclosed, according to an illustrative embodiment. In various embodiments, one or more operations discussed herein may be performed by the spoofing detection service 174 on one or more instance of the network server 170. In some embodiments, one or more operations of the method 400 can begin at operation 402, where the spoofing detection service 174 can obtain confidence parameters, such as the maximum confidence parameter 208 and the intermediate confidence parameter 210. From operation 402, the method 400 may proceed to operation 404, where the spoofing detection service 174 can determine a scheduled detection time instant has occurred, such as whether the measurement period 179 for the LPWA device 120 has elapsed, thereby indicating that incoming location data from the LPWA device 120 and the ELD 130 may be available. In some embodiments, if the scheduled detection time instant has not yet occurred, the method 400 may proceed along the NO path, where the operation 404 may be repeated. In some embodiments, if the scheduled detection time instance is occurring, then the method 400 may proceed along the YES path to operation 406, where the spoofing detection service 174 can identify instances of position and variance data for each of the ELD 130 and the LPWA device 120, such as the ELD GPS-based position data 214 and the ELD GPS-based position variance 216 (corresponding to the GPS location data 212) for the ELD 130, and the non-GPS-based position data 224 and the non-GPSbased position variance 226 (corresponding to the independent location data 222) for the LPWA device 120.

From operation 406, the method 400 may proceed to operation 408, where the Kalman filter engine 204 of the spoofing detection service 174 may apply a filter (e.g., a Kalman filter and/or an enhanced Kalman filter) to the instances of position and variance data for the ELD 130 and the LPWA device 120. In various embodiments, application of the Kalman filter and/or the enhanced Kalman filter can cause the Kalman filter engine 204 to generate the ELD estimates 230 and the LPWA device estimates 240, which are discussed below.

From operation 408, the method 400 may proceed to one or more of the operation 410 and/or the operation 414, where the operation 410 and the operation 414 may be performed sequentially and/or concurrently. For clarity purposes, a discussion of the method 400 proceeding to the operation 410 will be provided first. At operation 410, the spoofing detection service 174 can generate GPS-based confidence ellipsoid sets for location and velocity corresponding to the intermediate confidence level 210A for the ELD 130 (e.g., the $E_{1,INT}(t)$ 236 and the $V_{1,INT}(t)$ 237). From operation 410, the method 400 may proceed to operation 412, where the spoofing detection service 174 can generate non-GPS-based confidence ellipsoid sets for location and velocity corresponding to the intermediate confidence level 210A for the LPWA device 120 (e.g., the $E_{2,INT}(t)$ 246 and the $V_{2,INT}(t)$ 247). From operation 412, the method 400 may proceed to operation 414, where the spoofing detection service 174 can generate GPS-based confidence ellipsoid sets for location and velocity corresponding to the maximum confidence level 208A for the ELD 130 (e.g., the $E_{1,MAX}(t)$ 234 and the $V_{1,MAX}(t)$ 235). From operation 414, the method 400 may proceed to operation 416, where the spoofing detection service 174 can generate non-GPS-based confidence ellipsoid sets for location and velocity corresponding to the maximum confidence level 208A for the LPWA device 120 (e.g., the $E_{2,MAX}(t)$ and the $V_{2,MAX}(t)$ 245). From operation 416, the method 400 may proceed to operation 418.

In various embodiments, at operation 418, the spoofing detection service 174 may determine whether intersections between various confidence ellipsoid sets have occurred or have not occurred. Specifically, the spoofing detection service 174 can determine if the $E_{1,INT}(t)$ 236 does not intersect the $E_{2,INT}(t)$ 246, or if the $V_{1,INT}(t)$ 237 does not intersect the $V_{2,INT}(t)$ 247. If the spoofing detection service 174 determines that there exists no intersection between $E_{1,INT}(t)$ 236 and the $E_{2,INT}(t)$ 246, or there is no intersection between the $V_{1,INT}(t)$ 237 and the $V_{2,INT}(t)$ 247, then a GPS spoofing attack may have occurred, or has occurred, and thus the method 400 may proceed along the YES path. In some embodiments, the method 400 may proceed along the YES path to operation 420 for further verification of the existence of a GPS spoofing attack. In various embodiments, if either the $E_{1,INT}(t)$ 236 does not intersect the $E_{2,INT}(t)$ 246 or the $V_{1,INT}(t)$ 237 does not intersect the $V_{2,INT}(t)$ 247, then the method 400 may proceed along the YES path from operation 418 to operation 420. In some embodiments, the method 400 may proceed along the YES path from operation 418 to operation 424, which is discussed below. Returning to operation 418, in various embodiments, if the spoofing detection service 174 determines that the $E_{1,INT}(t)$ 236 intersects the $E_{2,INT}(t)$ 246, and that the $V_{1,INT}(t)$ 237 intersects the $V_{2,INT}(t)$ 247, then a GPS spoofing attack may not have, or has not, occurred, and thus the method 400 may proceed along the NO path from operation 418 to operation 422, which will be discussed in further detail below. For clarity purposes, a discussion of operation 420 will be provided first, followed by a discussion of operation 422.

At operation 420, the spoofing detection service 174 can determine whether an intersection of the confidence ellipsoid sets at the maximum confidence level has occurred or has not occurred. Specifically, if the spoofing detection service 174 determines that the $E_{1,MAX}(t)$ 234 intersects the $E_{2,MAX}(t)$ 244 and that the $V_{1,MAX}(t)$ 235 intersects the $V_{2,MAX}(t)$ 245, then the ELD estimates 230 and the LPWA device estimates 240 both coincide with (or otherwise represent) the actual location 192, and therefore a GPS spoofing attack has not occurred (i.e., the existence of a GPS spoofing attack is not and/or has not been detected), which in turn can indicate that an instance of the GPS location data under analysis is reliable or otherwise accurate. As such, if the spoofing detection service 174 determines that the $E_{1,MAX}(t)$ 234 intersects the $E_{2,MAX}(t)$ 244 and that the $V_{1,MAX}(t)$ 235 intersects the $V_{2,MAX}(t)$ 245, then the method 400 may proceed along the NO path from operation 420 to operation 422.

At operation 422, the spoofing detection service 174 can set an instance of the GPS spoofing flag 184 to indicate that the GPS spoofing attack 107 has not occurred. From operation 422, the method 400 may proceed to operation 426, where the method 400 may end.

Returning to operation 420, if the spoofing detection service 174 determines that the $E_{1,MAX}(t)$ 234 does not intersect $E_{2,MAX}(t)$ 244 or that the $V_{1,MAX}(t)$ 235 does not intersect $V_{2,MAX}(t)$ 245, then a deviation distance exists (e.g., the deviation distance 194) and the LPWA device estimates 240 coincide with (or are very likely to coincide with or otherwise represent) the actual location 192 of the MTE 110, while the ELD estimates 230 coincide with (or are very likely to coincide with or otherwise represent) the spoofed location 107A, and therefore the method 400 may proceed along the YES path from operation 420 to operation 424. At operation 424, the spoofing detection service 174 can set an instance of the GPS spoofing flag 184 to indicate that the GPS spoofing attack 107 has occurred. From operation 424, the method 400 may proceed to operation 426, where the method 400 may end.

Figure 4B:
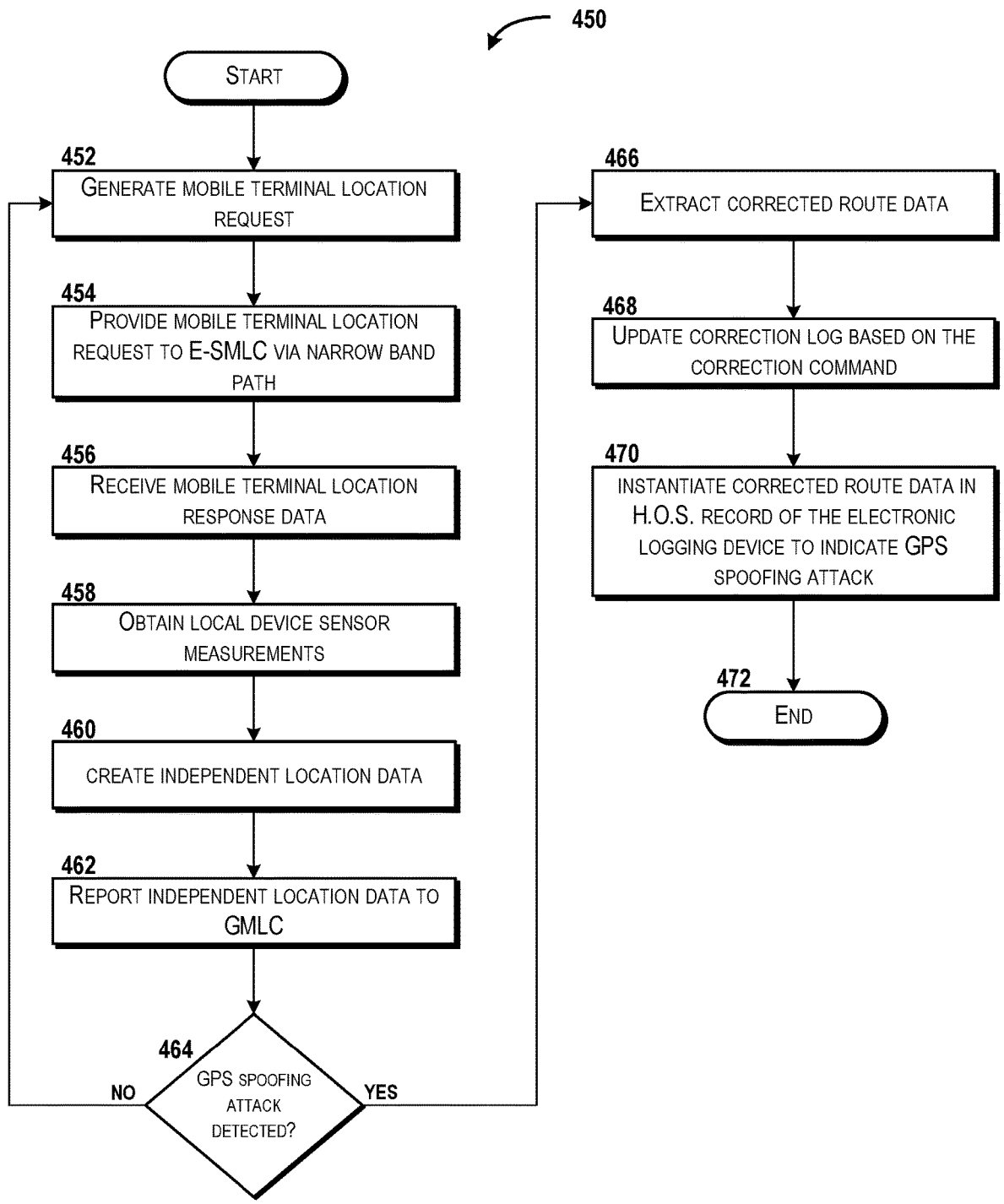
FIG. 4B is a flow diagram illustrating aspects of another method for global positioning system spoofing counter measures, according to another illustrative embodiment.

Turning now to FIG. 4B, the method 450 for global positioning system spoofing countermeasures is disclosed, according to an illustrative embodiment is disclosed, according to an illustrative embodiment. In various embodiments, one or more operations discussed herein may be performed by a low-power wide area device, such as an instance of the LPWA device 120. In some embodiments, one or more operations discussed herein may be performed by an instance of the ELD 130 and/or another component of the MTE 110, such as an instance of the TCU 116. In some embodiments, the method 450 can begin at operation 452, where the LPWA device 120 can generate a mobile terminal location request, such as an instance of the mobile terminal location request 142. The LPWA device 120 may configure one or more of the quality of service parameters 144. The mobile terminal location request 142 may be generated by the LPWA device 120 in order to obtain information about the current location of the LPWA device 120 as seen or otherwise detected by a network, such as the LPWAN 152 and/or the RAN 154. In some embodiments, an instance of the mobile terminal location request 142 may be generated according to a sampling rate 124 that is less than the sampling rate 132 of the ELD 130.

From operation 452, the method 450 may proceed to operation 454, where the LPWA device 120 can provide the mobile terminal location request 142 to the E-SMLC 158 via a narrow band path, such as illustrated by the communication path 1. In various embodiments, the mobile terminal location request 142 can be addressed or otherwise directed to the E-SMLC 158, and therefore may be relayed from the LPWAN 152 to a component of the RAN 154 that supports the E-SMLC 158, such as the network access point 156. In some embodiments, the narrow band path can correspond with a communication path that is used by a mobile Internet of Things device (which may also be referred to as a cellular Internet of Things device).

From operation 454, the method 450 may proceed to operation 456, where the LPWA device 120 may receive a response from the E-SMLC 158, such as an instance of the mobile terminal location response 146. The mobile terminal location response 146 can include an instance of the mobile terminal location response data 126, such as discussed with respect to FIG. 1. It is understood that the mobile terminal location response data 126 does not include GPS-based location information, and therefore the mobile terminal location response data 126 does not directly, or indirectly rely on GPS signals to provide an independent location determination.

From operation 456, the method 450 may proceed to operation 458, where the LPWA device 120 may obtain an instance of the local device sensor measurements 127 from the local device sensor 123, which in some embodiments, can correspond to a barometric pressure sensor and/or an altimeter. The local device sensor measurements 127 do not include GPS-based information (i.e., information obtained using GPS signals).

From operation 458, the method 450 may proceed to operation 460, where the LPWA device 120 can create an instance of independent location data, such as any instance from the independent location data 125A-N. For example, the LPWA device 120 may join the mobile terminal location response data 126 to the local device sensor measurements 127 so as to create an instance of the independent location data 125A-N.

From operation 460, the method 450 may proceed to operation 462, where the LPWA device 120 can report or otherwise provide the instance of the independent location data 125A-N to the GMLC 162. In some embodiments, the instance of the independent location data 125A-N may be provided along the communication path 1, which is configured to provide a narrow band path. As such, the LPWA device 120 can extend the communication range of the MTE 110 so that the independent location data 125A-N can be sent to the GMLC 162 even when the MTE 110 is out of range for communications using a broad band path, such as may be provided by the communication path 2.

From operation 462, the method 450 may proceed to operation 464, where the LPWA device 120 can detect whether an instance of the GPS spoofing attack 107 has occurred, such as by the LPWA device 120 receiving an instance of the GPS spoofing alert 185. In some embodiments, if an instance of the GPS spoofing attack 107 has not occurred, and thus the LPWA device 120 does not receive an instance of the GPS spoofing alert 185, then the method 450 may proceed along the NO path to operation 452 discussed above, where one or more operations may be implemented for the next time instance. In some embodiments, the LPWA device 120 may monitor for incoming instances of the GPS spoofing alert 185 while one or more of the operations discussed herein is being performed.

Returning to operation 464, if the LPWA device 120 detects that an instance of the GPS spoofing attack 107 has occurred, such as by the LPWA device 120 receiving an instance of the GPS spoofing alert 185, then the method 450 may proceed along the YES path to operation 466, where the LPWA device may extract an instance of the corrected route data 187 that provided information as to the actual location 192 of the MTE 110 and the ELD 130.

From operation 466, the method 450 may proceed to operation 468, where the LPWA device 120 may identify and analyze an instance of the correction command 188 that is included in the GPS spoofing alert 185, and in turn can update the correction log 128 of the LPWA device 120 based on the correction command 188. The correction log 128 can include a listing of various occurrences and instances of GPS spoofing attacks that have occurred for a particular ELD, such as the ELD 130, and/or a driver associated with the MTE 110. In various embodiments, the correction command 188 may instruct the LPWA device 120 to instantiate, or otherwise provide, the corrected route data 187 to the ELD 130.

From operation 468, the method 450 may proceed to operation 470, where the LPWA device 120 can instantiate, and/or instruct the ELD 130 to instantiate, the corrected route data 187 in the HOS record 134 of the ELD 130 so as to provide a record of the actual location 192 of the MTE 110 at the time of the GPS spoofing attack 107. The corrected route data 187 may supplement the HOS record 134, and therefore can preserve the erroneous location data that was generated by the ELD 130 based on the GPS spoofing signals 109A-N.

From operation 470, the method 450 may proceed to operation 472, where the method 450 may end.

Figure 5:
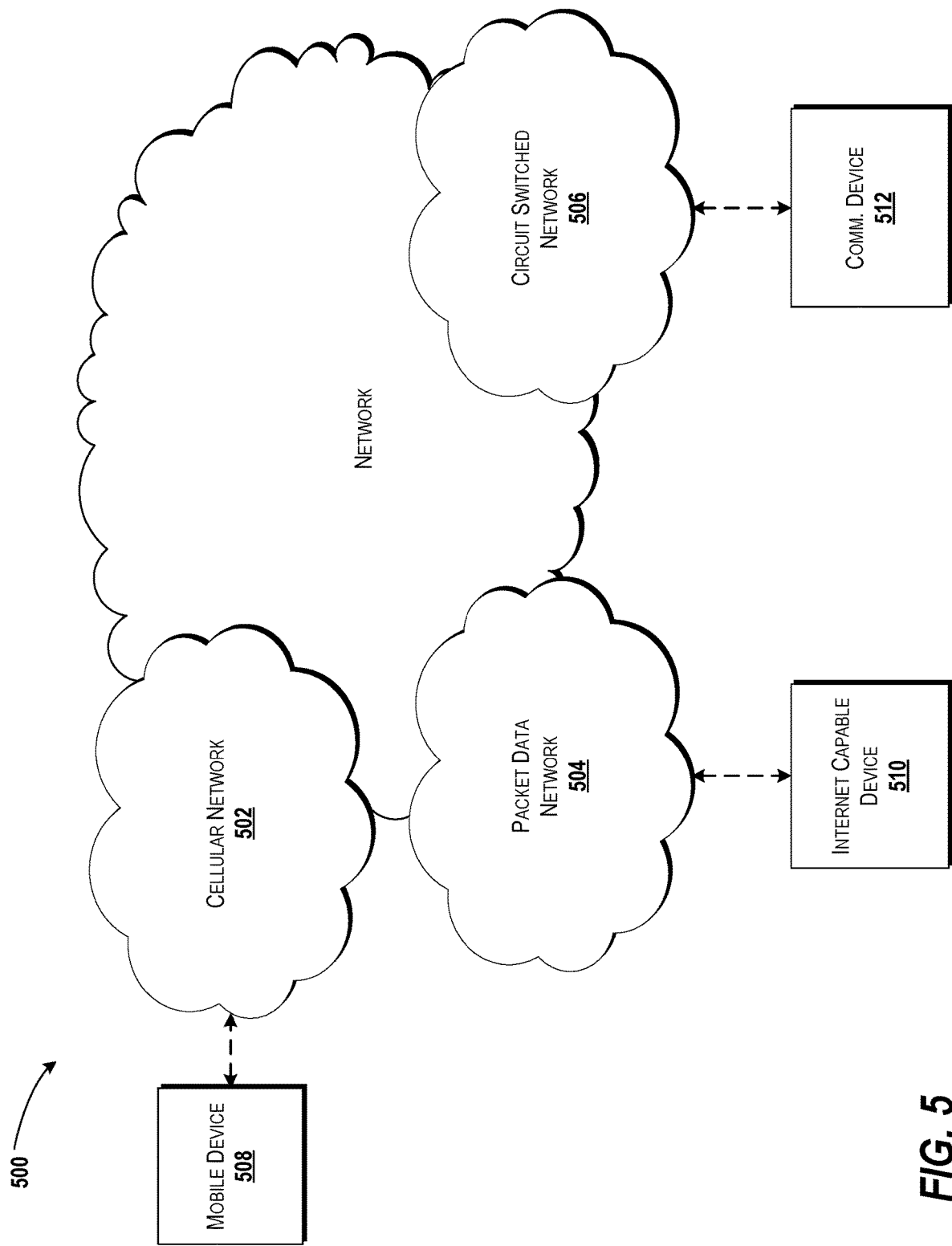
FIG. 5 is a diagram illustrating an example network capable of implementing aspects of the embodiments discussed herein.

Turning now to FIG. 5, a discussion of a network 500 is illustrated, according to an illustrative embodiment. In some embodiments, aspects of the network 150, the LPWAN 152, and/or the RAN 154 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G New Radio ("NR") components, functions, applications, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with, and/or otherwise configured to implement and support, mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems, devices, and/or equipment discussed with respect to FIG. 1, such as but not limited to the MTE 110 and/or the network server 170. In the specification, the network 150 and/or the network 500 can refer broadly to, in some embodiments, any combination of the networks 502, 504, 506. It should be appreciated that substantially all of the functionality described with reference to the network 150, the RAN 154, and/or the network 500 can, in some embodiments, be performed by the cellular network 502, the packet data network 504, and/or the circuit switched network 506, alone or in combination with other networks, network elements, and the like.

Figure 6:
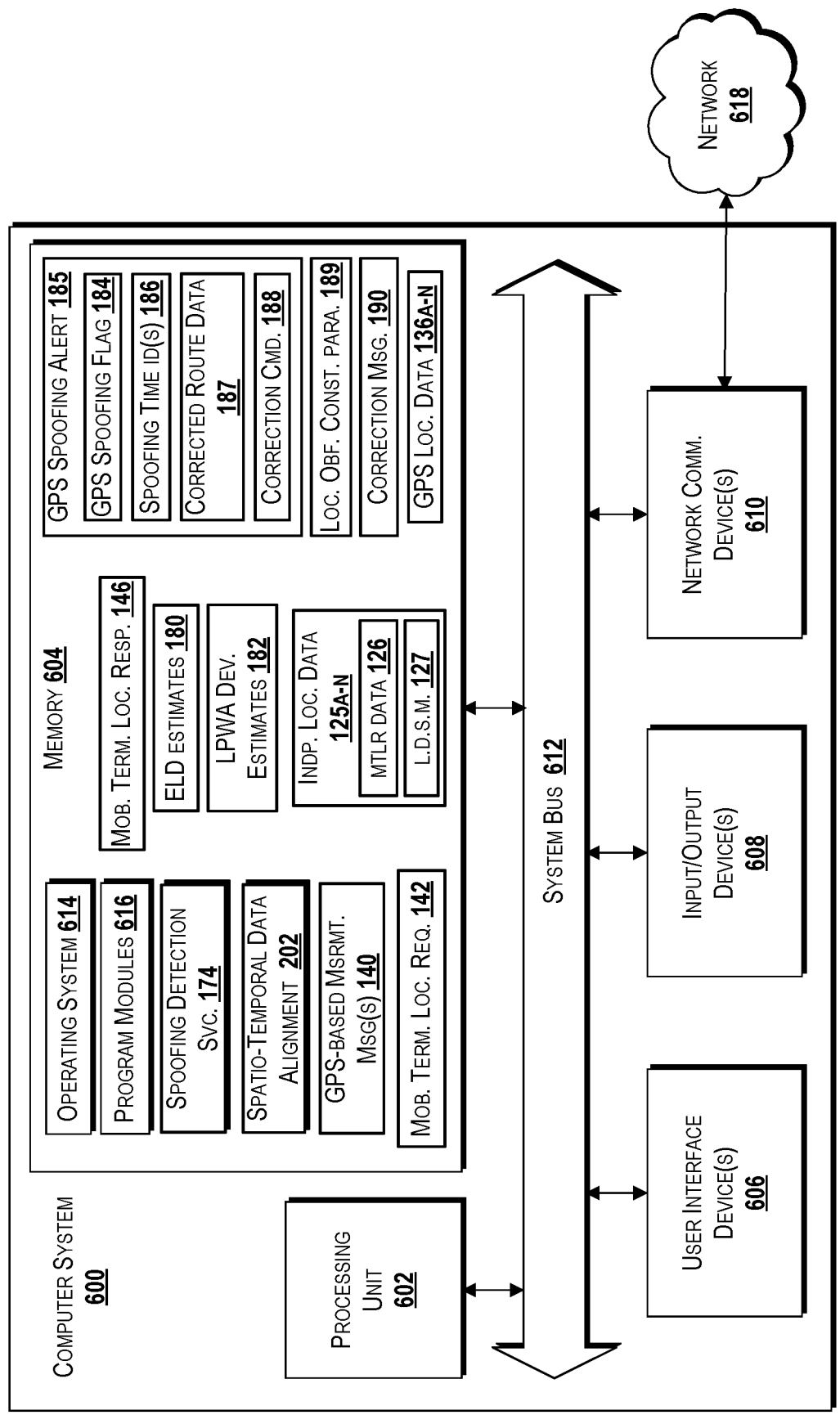
FIG. 6 is a block diagram illustrating an example computer system capable of implementing aspects of the embodiments presented and described herein.

FIG. 6 is a block diagram illustrating a computer system 600 can be configured to provide the functionality described herein related to wireless power transfer network management, in accordance with various embodiments of the concepts and technologies disclosed herein. In some embodiments, at least a portion of one or more of the MTE 110, the network server 170, the network access point 156, and/or other components of the operating environment 100 illustrated and described herein can be configured as and/or can have an architecture similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network communication devices 610. In some embodiments, the processor 111 and/or the processor 171 can be configured at least similar to the processing unit 602. In some embodiments, one or more instances of the processing unit 602 can be implemented within one or more devices and/or components of the operating environment 100, such as but not limited to one or more of the MTE 110, the LPWA device 120, the ELD 130, the network access point 156, and/or the network server 170. In some embodiments, one or more instances of the memory 604 can be implemented within one or more devices and/or components of the operating environment 100, such as but not limited to one or more of the MTE 110, the LPWA device 120, the ELD 130, the network access point 156, and/or the network server 170. In various embodiments, one or more aspects of the network server 170 can be included within the computer system 600.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in sequence and/or parallel in a single machine or in multiple machines. Furthermore, processors and/or processing units can be used to support virtual processing environments. Processors and processing units also can include state machines, application-specific integrated circuits ("ASICs"), combinations thereof, or the like. As used herein, the phrase "processing unit" may be referred to as a "processor." The processing unit 602 can include one or more central processing units ("CPUs") configured with one or more processing cores. The processing unit 602 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 602 can include one or more discrete GPUs. In some other embodiments, the processing unit 602 can include CPU and GPU components that are configured in accordance with a co-processing CPU/GPU computing model, wherein the sequential part of an application executes on the CPU and the computationally-intensive part is accelerated by the GPU. The processing unit 602 can include one or more system-on-chip ("SoC") components along with one or more other components including, for example, a memory, a communication component, or some combination thereof. In various embodiments, an instance of a processor (e.g., the processing unit 602) can be and/or can include one or more SNAPDRAGON SoCs, a cellular V2X ("C-V2X") chipset, and/or another architecture available from QUALCOMM of San Diego, Calif.; one or more TEGRA SoCs and/or another architecture available from NVIDIA of Santa Clara, Calif.; one or more HUMMINGBIRD SoCs and/or another architecture available from SAMSUNG of Seoul, South Korea; one or more Open Multimedia Application Platform ("OMAP") SoCs and/or another architecture available from TEXAS INSTRUMENTS of Dallas, Tex.; one or more customized versions of any of the above SoCs; and/or one or more proprietary SoCs and/or proprietary circuitry capable of supporting V2X communication processing. In various embodiments, an instance of a processor (e.g., the processing unit 602) can be and/or can include one or more hardware components architected in accordance with an ARM architecture, available for license from ARM HOLDINGS of Cambridge, United Kingdom. Alternatively (or additionally), an instance of a processor (e.g., the processing unit 602) can be or can include one or more hardware components architected in accordance with an x86 architecture, such as an architecture available from INTEL CORPORATION of Mountain View, Calif., and others. Those skilled in the technology will appreciate that the implementation of a processor (e.g., the processing unit 602) can utilize various computation architectures, and as such, a processor (e.g., the processing unit 602) should not be construed as being limited to any particular computation architecture or combination of computation architectures, including those explicitly disclosed herein. Because processors and/or processing units are generally known to one of ordinary skill, the processors and processing units disclosed and discussed herein will not be described in further detail herein.

The memory 604 communicates with the processing unit 602 via the system bus 612. In embodiments, the memory 112 and/or the memory 172 can be configured at least similar to the memory 604. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include the spoofing detection service 174, and/or other computer-readable instructions. These and/or other programs can be embodied in computer-executable instructions that, when executed by the processing unit 602, can facilitate performance of one or more of the methods 300, 400, and/or 450 described in detail above with respect to FIGS. 3A, 3B, 4A, and 4B. According to some embodiments, the program modules 616 may be embodied in hardware, software, firmware, or any combination thereof. It should be understood that the memory 604 also can be configured to store one or more instance of information and data discussed with respect to FIGS. 1, 2, 3A, 3B, 4A, and 4B, such as but not limited to the spatio-temporal data alignment 202, the GPS-based measurement messages 140, the mobile terminal location request 142, the mobile terminal location response 146, the ELD estimates 180, the LPWA device estimates 182, the independent location data 125A-N, the mobile terminal location response data 126, the local device sensor measurements 127, the GPS spoofing alert 185, the GPS spoofing flag 184, the spoofing time identifiers 186, the corrected route data 187, the correction command 188, the LOCP 189, the correction message 190, the GPS location data 136A-N, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network communication devices 610 enable the computer system 600 to communicate with other networks or remote systems via a network, such as network 618. Examples of network communication devices 610 include, but are not limited to, a modem, a radio frequency ("RF")

transceiver and/or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). In some embodiments, the network 618 may include one or more aspects of the network 500, discussed above. It should be understood that the examples provided are for illustration purposes only, and therefore should not be construed as limiting in any way.

Figure 7:
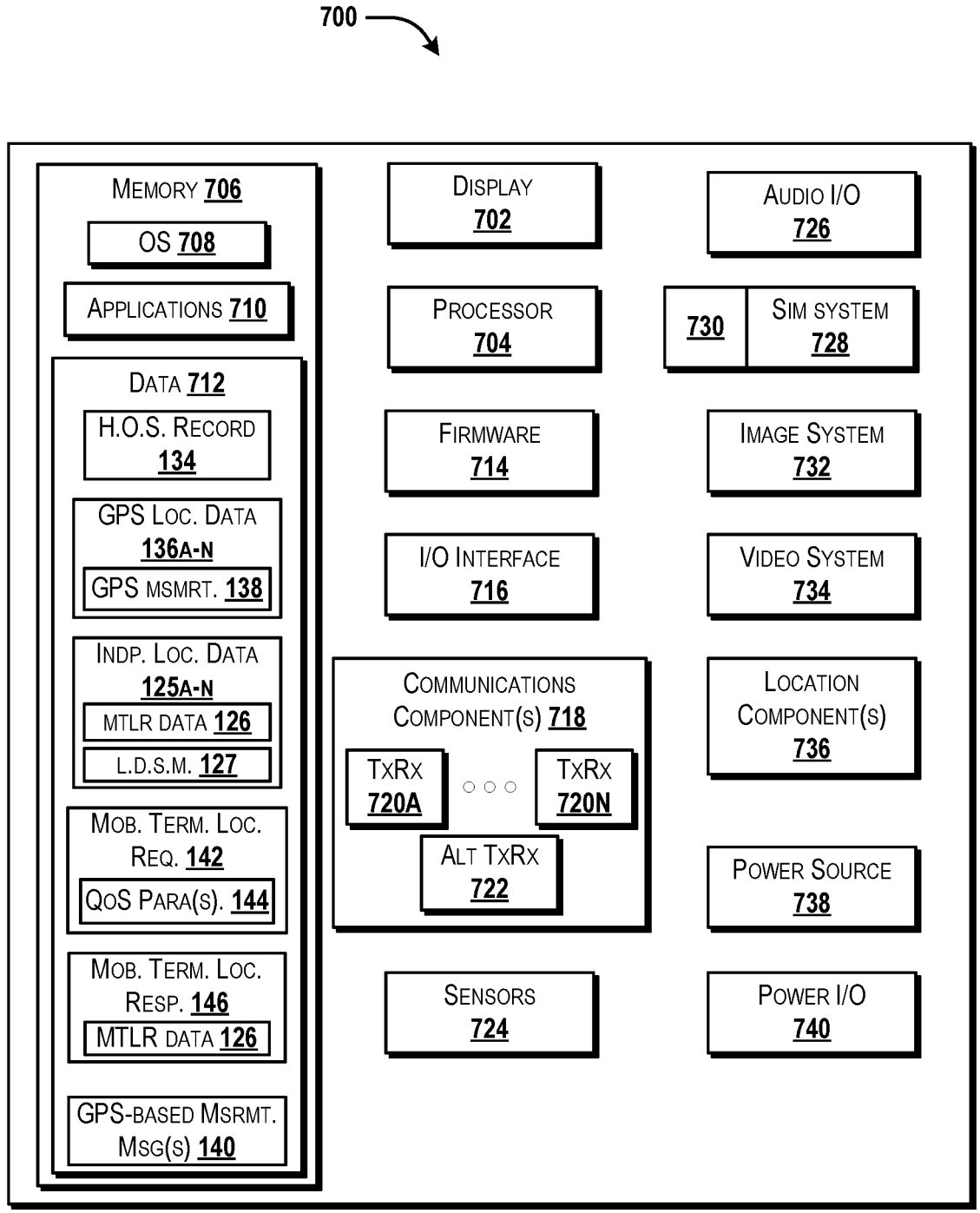
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the ELD 130, the LPWA device 120, and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). In various embodiments, aspects from one or more the TCU 116, the head unit 114, the LPWA device 120, and/or the ELD 130 can be configured or otherwise implemented in the user equipment 700. As such, an instance of the MTE 110 may include one or more aspects of the user equipment 700 discussed herein. Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a display application that can present various communications, messages, and/or other computer-executable instructions stored in a memory 706, or the like. In some embodiments, the applications 710 also can include a UI application (not illustrated in FIG. 7) and/or vehicle software applications that can execute on the head unit 114 and/or the TCU 116.

One or more applications and/or computer readable instructions can interface with the operating system 708 to facilitate any of the operations discussed herein and functionality for presenting content and/or data stored at and/or received by the user equipment 700 and/or stored elsewhere. It is understood that one or more instances of the operating system 708 may be included and operate within one or more systems discussed with respect to the operating environment 100, such as but not limited to the MTE 110 and/or the network server 170. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

An application can be executed by the processor 704 to aid a user in presenting content, interacting with the LPWA device 120 and/or the ELD 130, engaging with the spoofing detection service 174, presenting a various communications, providing input or other information about the user equipment 700, presenting an identifier, configuring settings, manipulating address book content and/or settings, multi-mode interaction, interacting with other applications 710, and otherwise facilitating user interaction with the operating system 708, the applications 710, and/or other types or instances of data 712 that can be stored at the user equipment 700, such as stored by the memory 706. According to various embodiments, the data 712 can include, for example, instances of the HOS record 134, the GPS location data 136A-N, the GPS measurements 138, the independent location data 125A-N, the mobile terminal location response data 126, the local device sensor measurements 127, the mobile terminal location request 142, the quality of service parameters 144, the mobile terminal location response 146, the GPS-based measurement messages 140, any other elements discussed with respect to FIGS. 1, 2, 3A, 3B, 4A, and 4B, presence applications, wireless power transfer information, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1 (e.g., the TCU 116 of the MTE 110). The I/O interface 716 can be configured to support the input/output of data such as a message, communication, command, and/or instruction, and/or any other information or elements discussed with respect to FIGS. 1, 2, 3, and 4, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIRE-WIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks (e.g., the LPWAN 152, the network 150, and/or the RAN 154) and/or a network device (e.g., the network access point 156 and/or the network server 170) described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, LTE, LTE Advanced, 5G NR, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support one or more communications modes, such as a direct transmission mode over a PC5 interface and/or the network transmission mode over a Uu interface.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 may be included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards.

Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to GPS spoofing detection and countermeasures have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
   a processor; and
   a memory that stores computer-executable instructions that, in response to execution by the processor, cause the processor to perform operations comprising:
   identifying a mobile transportation equipment comprising an electronic logging device and a low-power wide area device, wherein the electronic logging device obtains global positioning system (GPS) location data from a GPS receiver unit and the low-power wide area device obtains independent location data via a narrow band path of a low-power wide area network,
   obtaining the GPS location data and the independent location data,
   determining that a spatio-temporal misalignment exists between the independent location data and the GPS location data for the mobile transportation equipment,
   providing spatio-temporal data alignment that generates electronic logging device estimates and low-power wide area device estimates,
   determining that a GPS spoofing attack has occurred based on the electronic logging device estimates and the low-power wide area device estimates,
   creating a GPS spoofing alert for the mobile transportation equipment, and
   generating an hours of service correction command that includes the GPS spoofing alert, wherein the hours of service correction command instructs the electronic logging device to update an hours of service log with corrected route data and spoofing time identifiers corresponding to the GPS spoofing attack.

2. The system of claim 1, wherein the independent location data includes mobile terminal location response data that is joined to local data sensor measurements.

3. The system of claim 1, wherein the electronic logging device maintains an hours of service record that tracks movement of the mobile transportation equipment based on the GPS location data.

4. The system of claim 1, wherein the operations further comprise:
   detecting that an off-duty driving mode was activated on the mobile transportation equipment; and
   obtaining a location obfuscation constraint parameter that defines an allowable deviation distance for the mobile transportation equipment.

5. The system of claim 4, wherein the operations further comprise in response to determining that a deviation distance exceeds the allowable deviation distance provided by the location obfuscation constraint parameter, generating the corrected route data representing an actual location of the mobile transportation equipment during the GPS spoofing attack.

6. The system of claim 4, wherein the operations further comprise in response to determining that a deviation distance does not exceed the allowable deviation distance provided by the location obfuscation constraint parameter, withholding the GPS spoofing alert from being provided to the electronic logging device until the deviation distance exceeds the allowable deviation distance.

7. A method comprising:
   identifying, by a network server executing a processor, a mobile transportation equipment comprising an electronic logging device and a low-power wide area device, wherein the electronic logging device obtains global positioning system (GPS) location data from a GPS receiver unit and the low-power wide area device obtains independent location data via a narrow band path of a low-power wide area network;
   obtaining, by the network server, the GPS location data and the independent location data;
   determining, by the network server, that a spatio-temporal misalignment exists between the independent location data and the GPS location data for the mobile transportation equipment;
   providing, by the network server, spatio-temporal data alignment that generates electronic logging device estimates and low-power wide area device estimates;
   determining, by the network server, that a GPS spoofing attack has occurred based on the electronic logging device estimates and the low-power wide area device estimates;
   creating, by the network server, a GPS spoofing alert for the mobile transportation equipment; and
   generating, by the network server, an hours of service correction command that includes the GPS spoofing alert, wherein the hours of service correction command instructs the electronic logging device to update an hours of service log with corrected route data and spoofing time identifiers corresponding to the GPS spoofing attack.

8. The method of claim 7, wherein the independent location data includes mobile terminal location response data that is joined to local data sensor measurements.

9. The method of claim 7, wherein the electronic logging device maintains an hours of service record that tracks movement of the mobile transportation equipment based on the GPS location data.

10. The method of claim 7, further comprising:
    detecting, by the network server, that an off-duty driving mode was activated on the mobile transportation equipment; and
    obtaining, by the network server, a location obfuscation constraint parameter that defines an allowable deviation distance for the mobile transportation equipment.

11. The method of claim 10, further comprising in response to determining that a deviation distance exceeds the allowable deviation distance provided by the location obfuscation constraint parameter, generating, by the network server, the corrected route data representing an actual location of the mobile transportation equipment during the GPS spoofing attack.

12. The method of claim 10, further comprising in response to determining that a deviation distance does not exceed the allowable deviation distance provided by the location obfuscation constraint parameter, withholding, by the network server, the GPS spoofing alert from being provided to the electronic logging device until the deviation distance exceeds the allowable deviation distance.

13. A computer storage medium having computer-executable instructions stored thereon that, in response to execution by a processor, causes the processor to perform operations comprising:
    identifying a mobile transportation equipment comprising an electronic logging device and a low-power wide area device, wherein the electronic logging device obtains global positioning system (GPS) location data from a GPS receiver unit and the low-power wide area device obtains independent location data via a narrow band path of a low-power wide area network;
    obtaining the GPS location data and the independent location data;
    determining that a spatio-temporal misalignment exists between the independent location data and the GPS location data for the mobile transportation equipment;
    providing spatio-temporal data alignment that generates electronic logging device estimates and low-power wide area device estimates;
    determining that a GPS spoofing attack has occurred based on the electronic logging device estimates and the low-power wide area device estimates;
    creating a GPS spoofing alert for the mobile transportation equipment; and
    generating an hours of service correction command that includes the GPS spoofing alert, wherein the hours of service correction command instructs the electronic logging device to update an hours of service log with corrected route data and spoofing time identifiers corresponding to the GPS spoofing attack.

14. The computer storage medium of claim 13, wherein the independent location data includes mobile terminal location response data that is joined to local data sensor measurements.

15. The computer storage medium of claim 13, wherein the operations further comprise:
    detecting that an off-duty driving mode was activated on the mobile transportation equipment; and
    obtaining a location obfuscation constraint parameter that defines an allowable deviation distance for the mobile transportation equipment.

16. The computer storage medium of claim 15, wherein the operations further comprise in response to determining that a deviation distance exceeds the allowable deviation distance provided by the location obfuscation constraint parameter, generating the corrected route data representing an actual location of the mobile transportation equipment during the GPS spoofing attack.

17. The computer storage medium of claim 15, wherein the operations further comprise in response to determining that a deviation distance does not exceed the allowable deviation distance provided by the location obfuscation constraint parameter, withholding the GPS spoofing alert from being provided to the electronic logging device until the deviation distance exceeds the allowable deviation distance.

* * * * *